US012029695B2

(12) United States Patent
Hayes et al.

(10) Patent No.: US 12,029,695 B2
(45) Date of Patent: *Jul. 9, 2024

(54) ENERGY STORAGE DEVICE MANAGEMENT FOR A PATIENT SUPPORT APPARATUS

(71) Applicant: Stryker Corporation, Kalamazoo, MI (US)

(72) Inventors: Michael J. Hayes, South Haven, MI (US); Daniel V. Brosnan, Kalamazoo, MI (US); Annie Desaulniers, Bothell, WA (US); Aaron D. Furman, Kalamazoo, MI (US); Alexey Titov, Redmond, WA (US); Ming Chen, Ann Arbor, MI (US); Krishna S. Bhimavarapu, Kalamazoo, MI (US); Kevin M. Patmore, Plainwell, MI (US)

(73) Assignee: Stryker Corporation, Kalamazoo, MI (US)

( * ) Notice: Subject to any disclaimer, the term of this patent is extended or adjusted under 35 U.S.C. 154(b) by 74 days.

This patent is subject to a terminal disclaimer.

(21) Appl. No.: 17/836,125

(22) Filed: Jun. 9, 2022

(65) Prior Publication Data

US 2022/0296445 A1 Sep. 22, 2022

Related U.S. Application Data

(63) Continuation of application No. 16/168,144, filed on Oct. 23, 2018, now Pat. No. 11,389,357.
(Continued)

(51) Int. Cl.
*A61G 7/018* (2006.01)
*A61G 1/02* (2006.01)
(Continued)

(52) U.S. Cl.
CPC ............. *A61G 7/08* (2013.01); *A61G 1/0275* (2013.01); *A61G 5/047* (2013.01); *A61G 7/018* (2013.01);
(Continued)

(58) Field of Classification Search
CPC ......... A61G 7/05; A61G 7/018; A47L 9/2873; A47L 2201/02
See application file for complete search history.

(56) References Cited

U.S. PATENT DOCUMENTS 3,644,945 A 2/1972 Goodman et al.
3,743,905 A 7/1973 Goodman et al.
(Continued)

FOREIGN PATENT DOCUMENTS

AU 2008316723 A1 4/2009
CA 2187727 A1 4/1997
(Continued)

OTHER PUBLICATIONS

Colson Group USA, "EZ Wheel Brochure", 2017, 4 pages.
(Continued)

*Primary Examiner* — Eric J Kurilla
(74) *Attorney, Agent, or Firm* — Howard & Howard Attorneys PLLC

(57) ABSTRACT

A system is provided that comprises a patient support apparatus and a unit being independent from the patient support apparatus. The patient support apparatus comprises a support structure having a base and a patient support surface for a patient. The patient support apparatus also comprises an electrical distribution system, one or more electrical devices, and an energy storage device (ESD) configured to store energy to power the one or more electrical devices through the electrical distribution system. The unit is configured to autonomously interact with the patient
(Continued)

support apparatus to remove the ESD from the patient support apparatus and/or to place a replacement ESD on to the patient support apparatus.

20 Claims, 19 Drawing Sheets

Related U.S. Application Data

(60) Provisional application No. 62/576,318, filed on Oct. 24, 2017.

(51) Int. Cl.
    *A61G 5/04*     (2013.01)
    *A61G 7/05*     (2006.01)
    *A61G 7/08*     (2006.01)
    *B25J 11/00*     (2006.01)
    *H02J 7/34*     (2006.01)

(52) U.S. Cl.
    CPC ............... *A61G 7/05* (2013.01); *B25J 11/009* (2013.01); *H02J 7/345* (2013.01)

(56) References Cited

U.S. PATENT DOCUMENTS

| | | | |
|---|---|---|---|
| 3,763,979 A | 10/1973 | Goodman et al. |
| 4,095,822 A | 6/1978 | Thornhill |
| 4,944,056 A | 7/1990 | Schroeder et al. |
| 4,961,422 A | 10/1990 | Marchosky et al. |
| 5,164,623 A | 11/1992 | Shkondin |
| 5,197,466 A | 3/1993 | Marchosky et al. |
| 5,591,217 A | 1/1997 | Barreras |
| 5,697,110 A | 12/1997 | Campbell |
| 5,708,993 A | 1/1998 | Campbell et al. |
| 5,769,877 A | 6/1998 | Barreras, Sr. |
| 5,806,110 A | 9/1998 | Kunz et al. |
| 5,806,111 A | 9/1998 | Heimbrock et al. |
| 5,807,397 A | 9/1998 | Barreras |
| 5,821,728 A | 10/1998 | Schwind |
| 5,991,665 A | 11/1999 | Wang et al. |
| 6,460,828 B1 | 10/2002 | Gersemsky et al. |
| 6,532,607 B1 | 3/2003 | Heil |
| 6,802,385 B2 | 10/2004 | Pyntikov et al. |
| 6,838,174 B2 | 1/2005 | Nakahigashi |
| 6,870,475 B2 | 3/2005 | Fitch et al. |
| 6,871,714 B2 | 3/2005 | Johnson |
| 6,896,468 B2 | 5/2005 | Gallea et al. |
| 6,966,083 B1 | 11/2005 | Cheng |
| 7,010,369 B2 | 3/2006 | Borders et al. |
| 7,154,397 B2 | 12/2006 | Zerhusen et al. |
| 7,256,705 B2 | 8/2007 | Kagermeier et al. |
| 7,321,811 B1 | 1/2008 | Rawls-Meehan |
| 7,398,571 B2 | 7/2008 | Souke et al. |
| 7,404,221 B2 | 7/2008 | Sackner |
| 7,465,280 B2 | 12/2008 | Rawls-Meehan |
| 7,528,521 B2 | 5/2009 | Naitou et al. |
| 7,530,616 B2 | 5/2009 | Pomper |
| 7,650,192 B2 | 1/2010 | Wahlstrand |
| 7,679,520 B2 | 3/2010 | Zerhusen et al. |
| 7,725,968 B2 | 6/2010 | Lambarth |
| 7,825,544 B2 | 11/2010 | Jansen et al. |
| 7,868,740 B2 | 1/2011 | McNeely et al. |
| 7,887,113 B2 | 2/2011 | Lambarth et al. |
| 7,911,349 B2 | 3/2011 | Zerhusen et al. |
| 8,000,800 B2 | 8/2011 | Takeda et al. |
| 8,006,332 B2 | 8/2011 | Lemire et al. |
| 8,019,486 B2 | 9/2011 | Rawls-Meehan |
| 8,031,057 B2 | 10/2011 | McNeely et al. |
| 8,032,263 B2 | 10/2011 | Rawls-Meehan |
| 8,035,255 B2 | 10/2011 | Kurs et al. |
| 8,046,115 B2 | 10/2011 | Rawls-Meehan |
| 8,046,116 B2 | 10/2011 | Rawls-Meehan |
| 8,046,117 B2 | 10/2011 | Rawls-Meehan |
| 8,056,163 B2 | 11/2011 | Lemire et al. |
| 8,056,950 B2 | 11/2011 | Souke et al. |
| 8,063,785 B2 | 11/2011 | Sacchetti |
| 8,069,512 B2 | 12/2011 | Rawls-Meehan |
| 8,078,336 B2 | 12/2011 | Rawls-Meehan |
| 8,078,337 B2 | 12/2011 | Rawls-Meehan |
| 8,106,539 B2 | 1/2012 | Schatz et al. |
| 8,121,856 B2 | 2/2012 | Huster et al. |
| 8,125,318 B2 | 2/2012 | Heimbrock et al. |
| 8,129,865 B2 | 3/2012 | Krumme et al. |
| 8,143,846 B2 | 3/2012 | Herman et al. |
| 8,177,274 B2 | 5/2012 | Pomper |
| 8,285,388 B2 | 10/2012 | Wahlstrand |
| 8,295,940 B2 | 10/2012 | Sherman |
| 8,304,935 B2 | 11/2012 | Karalis et al. |
| 8,324,759 B2 | 12/2012 | Karalis et al. |
| 8,334,779 B2 | 12/2012 | Zerhusen et al. |
| 8,344,860 B2 | 1/2013 | Collins, Jr. et al. |
| 8,362,742 B2 | 1/2013 | Kallmyer |
| 8,368,545 B2 | 2/2013 | Zerhusen et al. |
| 8,375,488 B2 | 2/2013 | Rawls-Meehan |
| 8,400,017 B2 | 3/2013 | Kurs et al. |
| 8,400,104 B2 | 3/2013 | Adamczyk et al. |
| 8,410,636 B2 | 4/2013 | Kurs et al. |
| 8,439,416 B2 | 5/2013 | Ambarth et al. |
| 8,441,154 B2 | 5/2013 | Karalis et al. |
| 8,447,366 B2 | 5/2013 | Ungari et al. |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,499,384 B2 | 8/2013 | Zerhusen |
| 8,536,990 B2 | 9/2013 | Collins, Jr. et al. |
| 8,551,163 B2 | 10/2013 | Aber et al. |
| 8,554,322 B2 | 10/2013 | Olson et al. |
| 8,565,934 B2 | 10/2013 | Rawls-Meehan |
| 8,569,914 B2 | 10/2013 | Karalis et al. |
| 8,587,153 B2 | 11/2013 | Schatz et al. |
| 8,587,155 B2 | 11/2013 | Giler et al. |
| 8,604,916 B2 | 12/2013 | McNeely et al. |
| 8,604,917 B2 | 12/2013 | Collins et al. |
| 8,606,344 B2 | 12/2013 | DiMaio et al. |
| 8,618,696 B2 | 12/2013 | Kurs et al. |
| 8,626,249 B2 | 1/2014 | Ungari et al. |
| 8,629,578 B2 | 1/2014 | Kurs et al. |
| 8,634,981 B1 | 1/2014 | Hyde et al. |
| 8,641,629 B2 | 2/2014 | Kurokawa |
| 8,669,676 B2 | 3/2014 | Karalis et al. |
| 8,674,839 B2 | 3/2014 | Zerhusen et al. |
| 8,686,598 B2 | 4/2014 | Schatz et al. |
| 8,692,410 B2 | 4/2014 | Schatz et al. |
| 8,716,903 B2 | 5/2014 | Kurs et al. |
| 8,723,366 B2 | 5/2014 | Fiorello et al. |
| 8,725,262 B2 | 5/2014 | Olson et al. |
| 8,729,737 B2 | 5/2014 | Schatz et al. |
| 8,764,621 B2 | 7/2014 | Badstibner et al. |
| 8,772,973 B2 | 7/2014 | Kurs |
| 8,782,826 B2 | 7/2014 | White et al. |
| 8,799,011 B2 | 8/2014 | Wilson et al. |
| 8,847,548 B2 | 9/2014 | Kesler et al. |
| 8,862,241 B2 | 10/2014 | Forsell |
| 8,864,205 B2 | 10/2014 | Lemire et al. |
| 8,866,598 B2 | 10/2014 | Collins, Jr. et al. |
| 8,869,328 B2 | 10/2014 | Rawls-Meehan |
| 8,886,333 B2 | 11/2014 | Lui et al. |
| 8,886,383 B2 | 11/2014 | Hyde et al. |
| 8,887,619 B2 | 11/2014 | Kallmyer et al. |
| 8,890,470 B2 | 11/2014 | Partovi |
| 8,896,264 B2 | 11/2014 | Partovi |
| 8,901,778 B2 | 12/2014 | Kesler et al. |
| 8,901,779 B2 | 12/2014 | Kesler et al. |
| 8,901,881 B2 | 12/2014 | Partovi |
| 8,907,531 B2 | 12/2014 | Hall et al. |

(56) References Cited

U.S. PATENT DOCUMENTS

| | | |
|---|---|---|
| 8,909,378 B2 | 12/2014 | Rawls-Meehan |
| 8,912,687 B2 | 12/2014 | Kesler et al. |
| 8,917,166 B2 | 12/2014 | Collins, Jr. et al. |
| 8,928,276 B2 | 1/2015 | Kesler et al. |
| 8,933,594 B2 | 1/2015 | Kurs et al. |
| 8,937,408 B2 | 1/2015 | Ganem et al. |
| 8,946,938 B2 | 2/2015 | Kesler et al. |
| 8,963,488 B2 | 2/2015 | Campanella et al. |
| 8,973,963 B2 | 3/2015 | Lambarth et al. |
| 8,984,685 B2 | 3/2015 | Robertson et al. |
| 9,002,469 B2 | 4/2015 | D'Ambrosio |
| 9,038,218 B1 | 5/2015 | Heil et al. |
| 9,044,365 B2 | 6/2015 | Rawls-Meehan |
| 9,044,366 B2 | 6/2015 | Rawls-Meehan |
| 9,050,031 B2 | 6/2015 | Collins, Jr. et al. |
| 9,052,718 B2 | 6/2015 | Hyde et al. |
| 9,059,599 B2 | 6/2015 | Won et al. |
| 9,079,043 B2 | 7/2015 | Stark et al. |
| 9,089,462 B1 | 7/2015 | Lafleche |
| 9,093,853 B2 | 7/2015 | Schatz et al. |
| 9,101,521 B2 | 8/2015 | White et al. |
| 9,105,959 B2 | 8/2015 | Kesler et al. |
| 9,106,203 B2 | 8/2015 | Kesler et al. |
| 9,107,783 B2 | 8/2015 | Childs et al. |
| 9,108,063 B2 | 8/2015 | Olson et al. |
| 9,114,050 B2 | 8/2015 | White et al. |
| 9,125,779 B2 | 9/2015 | Hyde et al. |
| 9,132,051 B2 | 9/2015 | Heil |
| 9,139,310 B1 | 9/2015 | Wang |
| 9,149,126 B2 | 10/2015 | Rawls-Meehan |
| 9,160,203 B2 | 10/2015 | Fiorello et al. |
| 9,161,633 B2 | 10/2015 | Rawls-Meehan |
| 9,173,793 B2 | 11/2015 | Rawls-Meehan |
| 9,173,794 B2 | 11/2015 | Rawls-Meehan |
| 9,182,750 B2 | 11/2015 | Rawls-Meehan |
| 9,184,595 B2 | 11/2015 | Kurs et al. |
| 9,218,454 B2 | 12/2015 | Kiani et al. |
| 9,220,651 B2 | 12/2015 | Hyde et al. |
| 9,233,039 B2 | 1/2016 | Hyde et al. |
| 9,237,814 B2 | 1/2016 | Rawls-Meehan |
| 9,241,858 B2 | 1/2016 | Hyde et al. |
| 9,246,336 B2 | 1/2016 | Kurs et al. |
| 9,259,369 B2 | 2/2016 | Derenne et al. |
| 9,270,134 B2 | 2/2016 | Gaddam et al. |
| 9,278,036 B2 | 3/2016 | Lee |
| 9,281,701 B2 | 3/2016 | Large et al. |
| 9,286,441 B2 | 3/2016 | Zerhusen et al. |
| 9,289,336 B2 | 3/2016 | Lambarth et al. |
| 9,295,849 B2 | 3/2016 | Elghazzawi et al. |
| 9,306,322 B2 | 4/2016 | Bhimavarapu et al. |
| 9,308,303 B2 | 4/2016 | Badstibner et al. |
| 9,314,105 B2 | 4/2016 | Ralws-Meehan |
| 9,314,928 B2 | 4/2016 | Hyde et al. |
| 9,314,929 B2 | 4/2016 | Hyde et al. |
| 9,333,136 B2 | 5/2016 | Gibson et al. |
| 9,336,672 B2 | 5/2016 | Collins, Jr. et al. |
| 9,364,625 B2 | 6/2016 | Silver et al. |
| 9,369,182 B2 | 6/2016 | Kurs et al. |
| 9,375,374 B2 | 6/2016 | Herman et al. |
| 9,381,125 B2 | 7/2016 | Herbst et al. |
| 9,392,875 B2 | 7/2016 | Weyl |
| 9,397,518 B1 | 7/2016 | Theobald |
| 9,407,110 B2 | 8/2016 | Lui et al. |
| 9,425,640 B2 | 8/2016 | Moran |
| 9,427,367 B2 | 8/2016 | White et al. |
| 9,433,546 B2 | 9/2016 | Rawls-Meehan et al. |
| 9,444,520 B2 | 9/2016 | Hall et al. |
| 9,451,833 B2 | 9/2016 | Rawls-Meehan |
| 9,456,939 B2 | 10/2016 | Ambarth et al. |
| 9,463,126 B2 | 10/2016 | Zerhusen et al. |
| 9,463,324 B2 | 10/2016 | Olson et al. |
| 9,465,915 B2 | 10/2016 | McNeely et al. |
| 9,492,339 B2 | 11/2016 | Leib |
| 9,496,719 B2 | 11/2016 | Kesler et al. |
| 9,513,899 B2 | 12/2016 | Collins, Jr. et al. |
| 9,515,494 B2 | 12/2016 | Kurs et al. |
| 9,515,495 B2 | 12/2016 | Kurs et al. |
| 9,517,034 B2 | 12/2016 | Collins, Jr. et al. |
| 9,526,346 B2 | 12/2016 | Rawls-Meehan |
| 9,526,665 B2 | 12/2016 | Rawls-Meehan et al. |
| 9,527,699 B2 | 12/2016 | Liljedahl |
| 9,537,344 B2 | 1/2017 | Thompson et al. |
| 9,560,787 B2 | 1/2017 | Kallmyer et al. |
| 9,577,436 B2 | 2/2017 | Kesler et al. |
| 9,584,189 B2 | 2/2017 | Kurs et al. |
| 9,596,005 B2 | 3/2017 | Kurs et al. |
| 9,601,261 B2 | 3/2017 | Schatz et al. |
| 9,601,270 B2 | 3/2017 | Kurs et al. |
| 9,615,983 B2 | 4/2017 | Stryker et al. |
| 9,734,293 B2 | 8/2017 | Collins, Jr. et al. |
| 9,768,645 B2 | 9/2017 | Tetu et al. |
| 10,004,651 B2 | 6/2018 | DeLuca et al. |
| 10,797,524 B2 | 10/2020 | Titov et al. |
| 11,389,357 B2 * | 7/2022 | Hayes .................. A61G 1/0275 |
| 2003/0079923 A1 | 5/2003 | Johnson |
| 2004/0083394 A1 | 4/2004 | Brebner et al. |
| 2005/0155149 A1 | 7/2005 | Pedersen |
| 2005/0212478 A1 | 9/2005 | Takenaka |
| 2006/0059623 A1 | 3/2006 | Karmer et al. |
| 2006/0108977 A1 | 5/2006 | Kagermeier et al. |
| 2006/0249320 A1 | 11/2006 | Carter et al. |
| 2007/0211866 A1 | 9/2007 | Sink |
| 2007/0219950 A1 | 9/2007 | Crawford |
| 2007/0299473 A1 | 12/2007 | Matos |
| 2008/0041282 A1 | 2/2008 | Goschy et al. |
| 2008/0086817 A1 | 4/2008 | Zucker et al. |
| 2008/0295595 A1 | 12/2008 | Tacklind et al. |
| 2009/0121660 A1 | 5/2009 | Rawls-Meehan |
| 2010/0045146 A1 | 2/2010 | Thorne |
| 2010/0162488 A1 | 7/2010 | Dahlin et al. |
| 2010/0277121 A1 | 11/2010 | Hall et al. |
| 2010/0314946 A1 | 12/2010 | Budde et al. |
| 2010/0328044 A1 | 12/2010 | Waffenschmidt et al. |
| 2011/0011878 A1 | 1/2011 | Baer et al. |
| 2011/0030142 A1 | 2/2011 | Karwal et al. |
| 2011/0043049 A1 | 2/2011 | Karalis et al. |
| 2011/0117529 A1 | 5/2011 | Barash et al. |
| 2011/0162067 A1 | 6/2011 | Shuart et al. |
| 2011/0208074 A1 | 8/2011 | Anderson |
| 2011/0247134 A1 | 10/2011 | Howell et al. |
| 2011/0247137 A1 | 10/2011 | Herman et al. |
| 2011/0278948 A1 | 11/2011 | Forsell |
| 2011/0298420 A1 | 12/2011 | Forsberg et al. |
| 2012/0056729 A1 | 3/2012 | Rawls-Meehan |
| 2012/0057685 A1 | 3/2012 | Rawls-Meehan |
| 2012/0069961 A1 | 3/2012 | Pomper et al. |
| 2012/0084920 A1 | 4/2012 | Zucker et al. |
| 2012/0086284 A1 | 4/2012 | Capanella et al. |
| 2012/0091794 A1 | 4/2012 | Campanella et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0110738 A1 | 5/2012 | Rawls-Meehan |
| 2012/0110824 A1 | 5/2012 | Smith et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0117730 A1 | 5/2012 | Lemire et al. |
| 2012/0119569 A1 | 5/2012 | Karalis et al. |
| 2012/0119698 A1 | 5/2012 | Karalis et al. |
| 2012/0123242 A1 | 5/2012 | Stilley et al. |
| 2012/0139355 A1 | 6/2012 | Ganem et al. |
| 2012/0228952 A1 | 9/2012 | Hall et al. |
| 2012/0235501 A1 | 9/2012 | Kesler et al. |
| 2012/0235502 A1 | 9/2012 | Kesler et al. |
| 2012/0235504 A1 | 9/2012 | Kesler et al. |
| 2012/0235566 A1 | 9/2012 | Karalis et al. |
| 2012/0242159 A1 | 9/2012 | Lou et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |

(56) References Cited

U.S. PATENT DOCUMENTS

| | | |
|---|---|---|
| 2012/0312196 A1 | 12/2012 | Newkirk |
| 2013/0106347 A1 | 5/2013 | Kallmyer et al. |
| 2013/0109973 A1 | 5/2013 | Kurokawa |
| 2013/0191992 A1 | 8/2013 | Rawls-Meehan |
| 2014/0004814 A1 | 1/2014 | Elghazzawi |
| 2014/0031883 A1 | 1/2014 | Elghazzawi |
| 2014/0039351 A1 | 2/2014 | Mix et al. |
| 2014/0045367 A1 | 2/2014 | Christie et al. |
| 2014/0057235 A1 | 2/2014 | Kellum et al. |
| 2014/0090173 A1 | 4/2014 | DiMaio et al. |
| 2014/0139405 A1 | 5/2014 | Ribble et al. |
| 2014/0145915 A1 | 5/2014 | Ribble et al. |
| 2014/0195057 A1 | 7/2014 | Zerhusen et al. |
| 2014/0259414 A1 | 9/2014 | Hayes et al. |
| 2014/0285016 A1 | 9/2014 | Tetu et al. |
| 2014/0312706 A1 | 10/2014 | Fiorello et al. |
| 2014/0312707 A1 | 10/2014 | Fiorello et al. |
| 2014/0327320 A1 | 11/2014 | Muhs et al. |
| 2014/0343968 A1 | 11/2014 | Wilson et al. |
| 2015/0069831 A1 | 3/2015 | Kesler et al. |
| 2015/0075575 A1 | 3/2015 | Karlovich |
| 2015/0088129 A1 | 3/2015 | Ganem et al. |
| 2015/0107020 A1 | 4/2015 | Andersson et al. |
| 2015/0115638 A1 | 4/2015 | Lambarth et al. |
| 2015/0123484 A1 | 5/2015 | Kurs et al. |
| 2015/0128353 A1 | 5/2015 | Kildey |
| 2015/0128354 A1 | 5/2015 | Greenstein et al. |
| 2015/0130412 A1 | 5/2015 | Partovi |
| 2015/0130586 A1 | 5/2015 | Rawls-Meehan |
| 2015/0135436 A1 | 5/2015 | Stryker et al. |
| 2015/0207351 A1 | 7/2015 | Hamburgen et al. |
| 2015/0216749 A1 | 8/2015 | Heil et al. |
| 2015/0251322 A1 | 9/2015 | Goodwin et al. |
| 2015/0252940 A1 | 9/2015 | Goodwin et al. |
| 2015/0255994 A1 | 9/2015 | Kesler et al. |
| 2015/0290061 A1 | 10/2015 | Stafford et al. |
| 2015/0296550 A1 | 10/2015 | Shelly et al. |
| 2015/0297427 A1 | 10/2015 | Ambarth et al. |
| 2015/0297439 A1 | 10/2015 | Karlovich |
| 2015/0335506 A9 | 11/2015 | Kildey |
| 2015/0342806 A1 | 12/2015 | Hyde et al. |
| 2015/0351981 A1 | 12/2015 | Sazonov |
| 2015/0351982 A1 | 12/2015 | Krenik |
| 2015/0357831 A1 | 12/2015 | Fiorello et al. |
| 2015/0360708 A1* | 12/2015 | Benton ............... B62B 5/0033 180/14.1 |
| 2015/0362333 A1 | 12/2015 | Miller et al. |
| 2015/0365138 A1 | 12/2015 | Miller et al. |
| 2016/0000622 A1 | 1/2016 | Rawls-Meehan |
| 2016/0013837 A1* | 1/2016 | Howell ............... H02J 7/0042 307/104 |
| 2016/0022218 A1 | 1/2016 | Hayes et al. |
| 2016/0028243 A1 | 1/2016 | Schatz et al. |
| 2016/0043571 A1 | 2/2016 | Kesler et al. |
| 2016/0052129 A1 | 2/2016 | Ekas |
| 2016/0052137 A1 | 2/2016 | Hyde et al. |
| 2016/0052138 A1 | 2/2016 | Hyde et al. |
| 2016/0052139 A1 | 2/2016 | Hyde et al. |
| 2016/0067396 A1 | 3/2016 | Stark et al. |
| 2016/0070267 A1 | 3/2016 | Hyde et al. |
| 2016/0075177 A1 | 3/2016 | Biderman et al. |
| 2016/0089283 A1 | 3/2016 | DeLuca et al. |
| 2016/0117450 A1 | 4/2016 | Zerhusen et al. |
| 2016/0120722 A1 | 5/2016 | Mueller |
| 2016/0120740 A1 | 5/2016 | Rawls-Meehan |
| 2016/0128468 A1 | 5/2016 | Lafleche et al. |
| 2016/0136018 A1 | 5/2016 | DeLuca et al. |
| 2016/0149425 A1 | 5/2016 | Hsu |
| 2016/0158082 A1 | 6/2016 | Gainor et al. |
| 2016/0158083 A1 | 6/2016 | Ambarth et al. |
| 2016/0175602 A1 | 6/2016 | Aoyama et al. |
| 2016/0193397 A9 | 7/2016 | Aber et al. |
| 2016/0199983 A1 | 7/2016 | Hyde et al. |
| 2016/0211695 A1 | 7/2016 | Singer |
| 2016/0213537 A1 | 7/2016 | Hayes et al. |
| 2016/0242558 A1 | 8/2016 | Rawls-Meehan et al. |
| 2016/0242681 A1 | 8/2016 | Shen et al. |
| 2016/0256080 A1 | 9/2016 | Shen et al. |
| 2016/0275776 A1 | 9/2016 | Shen et al. |
| 2016/0301253 A1 | 10/2016 | Kurs et al. |
| 2016/0306762 A1 | 10/2016 | Lee et al. |
| 2016/0330402 A1* | 11/2016 | Benetti ............... A61H 3/04 |
| 2016/0336812 A1 | 11/2016 | Fiorello et al. |
| 2016/0338891 A1 | 11/2016 | Agdeppa et al. |
| 2016/0362015 A1 | 12/2016 | Fiorello et al. |
| 2016/0367415 A1* | 12/2016 | Hayes ............... B60K 31/0008 |
| 2016/0367420 A1 | 12/2016 | Zerhusen et al. |
| 2016/0374884 A1 | 12/2016 | Blickensderfer et al. |
| 2017/0011181 A1 | 1/2017 | McNeely et al. |
| 2017/0015376 A1* | 1/2017 | Belman ............... G07F 17/0042 |
| 2017/0020440 A1 | 1/2017 | Flitsch et al. |
| 2017/0027789 A1 | 2/2017 | St.John et al. |
| 2017/0035295 A1 | 2/2017 | Collins, Jr. et al. |
| 2017/0035370 A1 | 2/2017 | Collins, Jr. et al. |
| 2017/0047762 A1 | 2/2017 | Tuseth et al. |
| 2017/0053736 A9 | 2/2017 | Hall et al. |
| 2017/0053737 A1 | 2/2017 | Kurs |
| 2017/0054319 A1 | 2/2017 | Kesler et al. |
| 2017/0055882 A1 | 3/2017 | Al-Ali et al. |
| 2017/0055887 A1 | 3/2017 | Al-Ali |
| 2017/0062124 A9 | 3/2017 | Hall et al. |
| 2017/0063143 A1 | 3/2017 | Hoarau et al. |
| 2017/0065766 A1 | 3/2017 | Olson et al. |
| 2017/0098044 A1 | 4/2017 | Lai et al. |
| 2017/0119607 A1 | 5/2017 | Derenne et al. |
| 2017/0158329 A1* | 6/2017 | Liu ............... B64C 39/024 |
| 2017/0259811 A1* | 9/2017 | Coulter ............... B60W 10/20 |
| 2017/0281440 A1 | 10/2017 | Puvogel et al. |
| 2017/0337797 A1* | 11/2017 | Mcclellan ............... G16H 10/60 |
| 2017/0340498 A1* | 11/2017 | Tessmer ............... A61G 13/104 |
| 2018/0056985 A1* | 3/2018 | Coulter ............... B60W 10/20 |
| 2018/0228676 A1* | 8/2018 | Merdek ............... H05B 47/11 |
| 2019/0046373 A1* | 2/2019 | Coulter ............... A61G 5/041 |
| 2019/0117487 A1 | 4/2019 | Hayes et al. |
| 2019/0123587 A1* | 4/2019 | Titov ............... A61G 7/05 |
| 2019/0231160 A1* | 8/2019 | Lu ............... A47L 11/4011 |
| 2022/0054336 A1* | 2/2022 | Newkirk ............... G06F 3/04847 |

FOREIGN PATENT DOCUMENTS

| | | |
|---|---|---|
| CN | 104097531 A | 10/2014 |
| EP | 0315210 B1 | 7/1994 |
| EP | 0700574 B1 | 7/1997 |
| NO | 2005077102 A2 | 8/2005 |
| NO | 2008150448 A1 | 12/2008 |
| NO | 2011096111 A1 | 8/2011 |
| NO | 2013049979 A1 | 4/2013 |
| WO | 8903665 A1 | 5/1989 |
| WO | 9100054 A1 | 1/1991 |
| WO | 9428560 A1 | 12/1994 |
| WO | 9620754 A1 | 7/1996 |
| WO | 2004038890 A1 | 5/2004 |
| WO | 2005016216 A2 | 2/2005 |
| WO | 2007063500 A2 | 6/2007 |
| WO | 2007064609 A1 | 6/2007 |
| WO | 2007118221 A2 | 10/2007 |
| WO | 2007136733 A2 | 11/2007 |
| WO | 2008003027 A2 | 1/2008 |
| WO | 2008036087 A1 | 3/2008 |
| WO | 2008050260 A1 | 5/2008 |
| WO | 2008050292 A2 | 5/2008 |
| WO | 2008055664 A2 | 5/2008 |
| WO | 2009009296 A3 | 3/2009 |
| WO | 2009055203 A1 | 4/2009 |
| WO | 2009055432 A2 | 4/2009 |
| WO | 2009120970 A2 | 10/2009 |
| WO | 2009123780 A1 | 10/2009 |
| WO | 2009135081 A2 | 11/2009 |
| WO | 2010027282 A2 | 3/2010 |
| WO | 2010036980 A1 | 4/2010 |
| WO | 2010059096 A1 | 5/2010 |
| WO | 2010059097 A1 | 5/2010 |
| WO | 2010093997 A1 | 8/2010 |
| WO | 2011113070 A1 | 9/2011 |

(56) References Cited

FOREIGN PATENT DOCUMENTS

| | | | |
|---|---|---|---|
| WO | 2011156768 | A2 | 12/2011 |
| WO | 2012087807 | A2 | 6/2012 |
| WO | 2012100219 | A1 | 7/2012 |
| WO | 2012122002 | A1 | 9/2012 |
| WO | 2012135118 | A1 | 10/2012 |
| WO | 2012170278 | A2 | 12/2012 |
| WO | 2013006845 | A2 | 1/2013 |
| WO | 2013009881 | A2 | 1/2013 |
| WO | 2013050699 | A1 | 4/2013 |
| WO | 2013044165 | A3 | 5/2013 |
| WO | 2013062808 | A1 | 5/2013 |
| WO | 2013062809 | A2 | 5/2013 |
| WO | 2013072306 | A1 | 5/2013 |
| WO | 2013074452 | A2 | 5/2013 |
| WO | 2013078092 | A1 | 5/2013 |
| WO | 2013112782 | A2 | 8/2013 |
| WO | 2013123119 | A1 | 8/2013 |
| WO | 2013131078 | A1 | 9/2013 |
| WO | 2013142840 | A1 | 9/2013 |
| WO | 2013156907 | A2 | 10/2013 |
| WO | 2013158675 | A1 | 10/2013 |
| WO | 2014014581 | A2 | 1/2014 |
| WO | 2014043659 | A1 | 3/2014 |
| WO | 2014046844 | A1 | 3/2014 |
| WO | 2014052147 | A2 | 4/2014 |
| WO | 2014052148 | A2 | 4/2014 |
| WO | 2014078667 | A1 | 5/2014 |
| WO | 2014097055 | A1 | 6/2014 |
| WO | 2014113164 | A1 | 7/2014 |
| WO | 2014150970 | A1 | 9/2014 |
| WO | 2014151577 | A1 | 9/2014 |
| WO | 2014164248 | A1 | 10/2014 |
| WO | 2015010702 | A1 | 1/2015 |
| WO | 2015106239 | A1 | 7/2015 |
| WO | 2015108653 | A1 | 7/2015 |
| WO | 2015148578 | A2 | 10/2015 |
| WO | 2015191819 | A1 | 12/2015 |
| WO | 2016090384 | A2 | 6/2016 |
| WO | 2016167594 | A1 | 10/2016 |
| WO | 2016179562 | A1 | 11/2016 |
| WO | 2017025735 | A1 | 2/2017 |
| WO | 2017040317 | A1 | 3/2017 |

OTHER PUBLICATIONS

Daily Mail Reporter, "Move over Fred Flintstone: The human-powered car that can reach speeds of up to 60mph", http://www.dailymail.co.uk/motoring/article-1304120/The-human-powered-car-reach-speeds-60mph.html, Aug. 19, 2010, 5 Pages.

English language abstract and machine-assisted English translation for CN 104097531 extracted from espacenet.com database on Jan. 10, 2019, 6 pages.

English language abstract and machine-assisted English translation for WO 2013/072306 extracted from espacenet.com database on Jan. 10, 2019, 14 pages.

English language abstract and machine-assisted English translation for WO 91/00054 extracted from espacenet.com database on Jan. 14, 2019, 11 pages.

English language abstract for WO 2008/055664 extracted from espacenet.com database on Jan. 14, 2019, 2 pages.

English language abstract for WO 2011/096111 and machine-assisted English translation for CN 102812617, an equivalent of WO 2011/096111, extracted from espacenet.com database on Jan. 10, 2019, 22 pages.

English language abstract for WO 2013/049979 extracted from espacenet.com database on Jan. 10, 2019, 1 page.

English language abstract for WO 2013/050699 extracted from espacenet.com database on Jan. 14, 2019, 1 page.

English language abstract not found for AU 2008316723; however, see English language equivalent U.S. Pat. No. 9,734,293. Original document extracted from espacenet.com databasse on Jan. 10, 2019, 1 page.

Ez-Wheel, "La Premiere Roue Electrique Autonome—Integrant Moteur and Batteries Brochure", http://www.ez-wheel.com, 2017, 8 pages.

Stryker SA, "Prime TC Transport Chair Brochure", 2013, 8 pages.

Youtube "Tesla Charging Snake Video", Aug. 6, 2015, https://www.youtube.com/watch?v=ut3sELMOyTM, 3 pages.

* cited by examiner

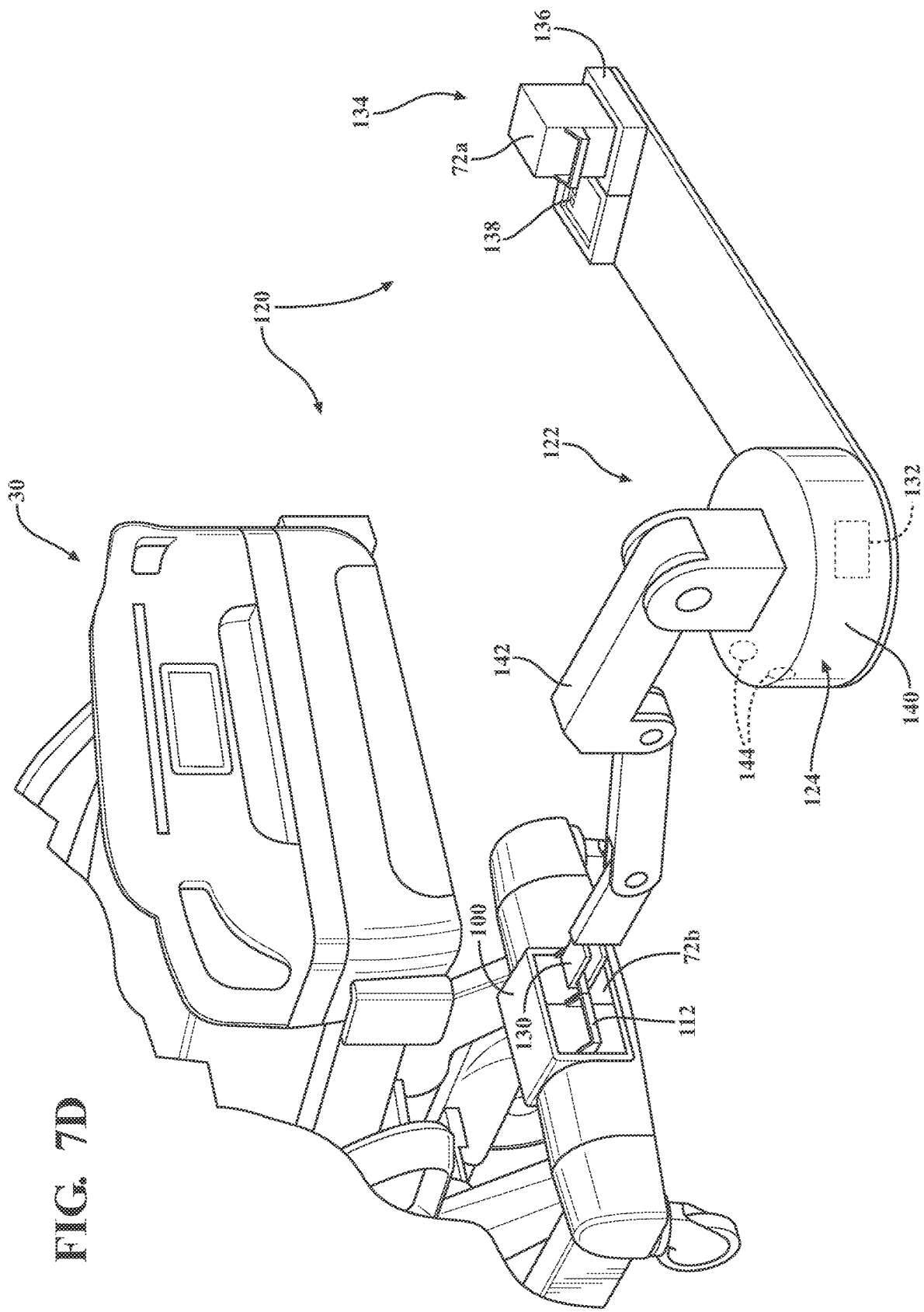

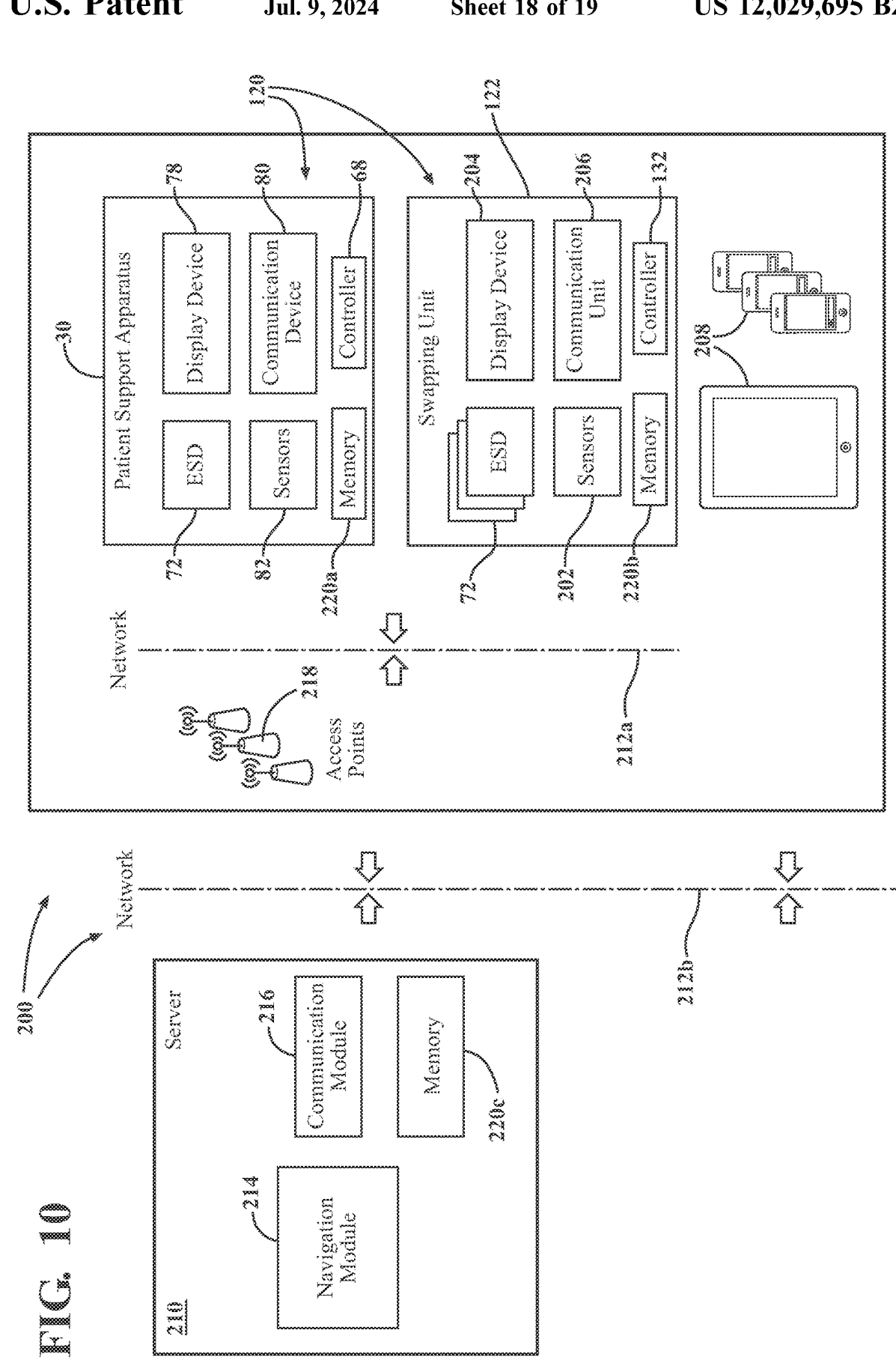

ENERGY STORAGE DEVICE MANAGEMENT FOR A PATIENT SUPPORT APPARATUS

CROSS-REFERENCE TO RELATED APPLICATIONS

The subject patent application is a Continuation of U.S. patent application Ser. No. 16/168,144, filed on Oct. 23, 2018, which claims priority to and all the benefits of U.S. Provisional Patent Application No. 62/576,318, filed on Oct. 24, 2017, the disclosures of each of which are hereby incorporated by reference in their entirety.

BACKGROUND

Patient support apparatuses such as hospital beds, stretchers, cots, wheelchairs, and chairs are routinely used by operators to move patients from one location to another. Conventional patient support apparatuses comprise a base and a patient support surface upon which the patient is supported. Wheels are coupled to the base to enable transport over floor surfaces.

A significant number of patient support apparatuses are not powered. However, there is increasing demand to provide patient support apparatuses with energy-consuming devices, such as motors, sensors, and electronics. Conventionally, such energy is provided either by a primary (non-rechargeable) battery or a rechargeable battery.

Patient care increasingly demands more and more attention from caregivers. Any activities that distract the caregiver from the patient are undesirable. One such distracting activity is attending to the battery of the patient support apparatus. For example, primary batteries require frequent replacement. Rechargeable batteries are often low-density and require high maintenance. For example, caregivers often must manually plug a power cord of the patient support apparatus to an electrical outlet (or station) for charging the battery. The power cord is burdensome to manage, thereby consuming more time of the caregiver. Furthermore, the patient support apparatus is generally not available for use when the power cord is plugged into the electrical outlet to charge the battery. Thus, conventional energy systems for patient support apparatuses are undesirable for at least these reasons.

A patient support apparatus with features designed to overcome one or more of the aforementioned challenges is desired.

BRIEF DESCRIPTION OF THE DRAWINGS

FIGS. 7A-7D are perspective views, partially in phantom, progressively showing interaction between the swapping unit and the patient support apparatus, wherein the swapping unit is embodied as a robotic device.

FIG. 10 is a block diagram of a network system wherein communication is handled between the patient support apparatus, the swapping unit, mobile display devices, and a remote server.

DETAILED DESCRIPTION

I. Patient Support Apparatus Overview

Figure 1:
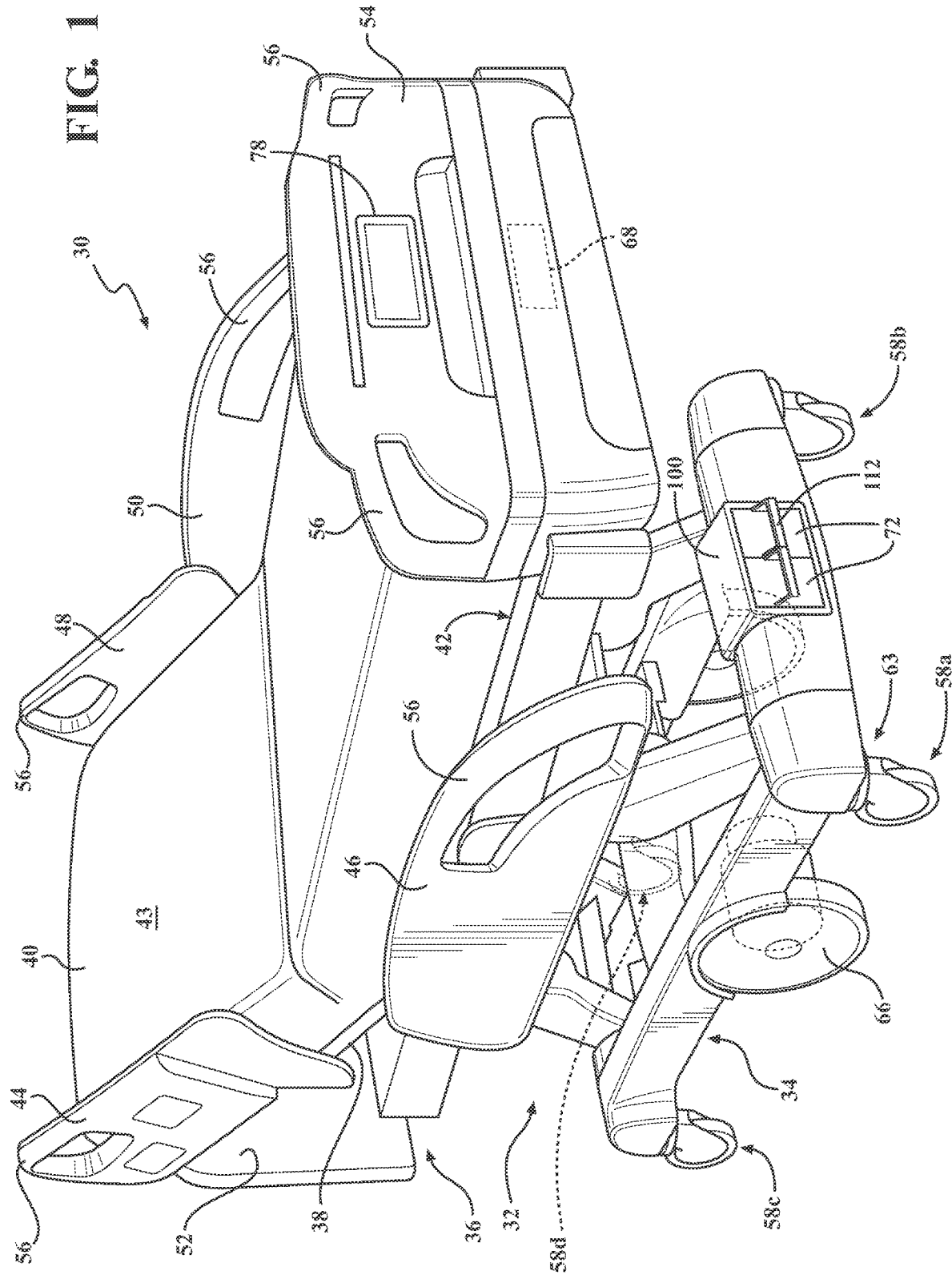
FIG. 1 is perspective view of a patient support apparatus comprising swappable energy storage devices, according to one embodiment.

Referring to FIG. 1, a patient support apparatus 30 is shown for moving a patient from one location to another. The patient support apparatus 30 illustrated in FIG. 1 is a hospital bed. In other embodiments, however, the patient support apparatus 30 may be a stretcher, cot, wheelchair, chair, or similar apparatus.

A support structure 32 provides support for the patient during movement of the patient support apparatus 30. The support structure 32 illustrated in FIG. 1 comprises a base 34 and an intermediate frame 36. The intermediate frame 36 is spaced above the base 34. The support structure 32 also comprises a patient support deck 38 disposed on the intermediate frame 36. The patient support deck 38 may comprise several sections, some of which are pivotable relative to the intermediate frame 36, such as a head section, a seat section, a thigh section, and a foot section. The patient support deck 38 provides a patient support surface 42 upon which the patient is supported. The patient support surface 42 is supported by the base 34.

A mattress 40 is disposed on the patient support deck 38. The mattress 40 comprises a direct patient support surface 43 upon which the patient is supported. The base 34, intermediate frame 36, patient support deck 38, and patient support surfaces 42, 43 each have a head end and a foot end corresponding to the designated placement of the patient's head and feet on the patient support apparatus 30. The construction of the support structure 32 may take on any suitable design, and is not limited to that specifically set forth above or shown in FIG. 1.

Side rails 44, 46, 48, 50 are coupled to the intermediate frame 36. A first side rail 44 is positioned at a right head end of the intermediate frame 36. A second side rail 46 is positioned at a right foot end of the intermediate frame 36. A third side rail 48 is positioned at a left head end of the intermediate frame 36. A fourth side rail 50 is positioned at a left foot end of the intermediate frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to enable such ingress and egress. In still other configurations, the patient support apparatus 30 may not include any side rails.

A headboard 52 and a footboard 54 are coupled to the intermediate frame 36. In other embodiments, when the headboard 52 and footboard 54 are included, the headboard 52 and footboard 54 may be coupled to other locations on the patient support apparatus 30, such as the base 34. In still other embodiments, the patient support apparatus 30 does not include the headboard 52 or the footboard 54.

Operator (human control) interfaces 56, such as handles, are shown integrated into the footboard 54 and side rails 44, 46, 48, 50 to facilitate movement of the patient support apparatus 30 over the floor surfaces. Additional operator interfaces 56 may be integrated into the headboard 52 and/or other components of the patient support apparatus 30. The operator interfaces 56 are graspable by the operator to manipulate the patient support apparatus 30 for movement. The operator interface 56 may comprise one or more handles coupled to the intermediate frame 36. The operator interface 56 may simply be a surface on the patient support apparatus 30 upon which the operator locally applies force to cause movement of the patient support apparatus 30 in one or more directions, also referred to as a push location. This may comprise one or more surfaces on the intermediate frame 36 or base 34. This could also comprise one or more surfaces on or adjacent to the headboard 52, footboard 54, and/or side rails 44, 46, 48, 50. In other embodiments, the operator interface 56 may comprise separate handles for each hand of the operator. For example, the operator interface 56 may comprise two handles. Other forms of the operator interface 56 are also contemplated.

One or more caster assemblies 58 are coupled to the base 34 to facilitate transport over floor surfaces. In one example, as shown in FIG. 1, four caster assemblies 58a-58d are arranged in each of four quadrants of the base 34 adjacent to corners of the base 34. In the embodiment shown, the caster assemblies 58a-58d are able to rotate and swivel relative to the support structure 32 during transport. The caster assemblies 58 may be non-steerable, steerable, non-powered, powered (driven), or any combinations thereof. The caster assemblies 58 may have any suitable shape or configuration other than those shown in the Figures.

The patient support apparatus 30 may comprise any suitable number of caster assemblies 58, such as two or six, etc. The caster assemblies 58 may have any suitable configuration and arrangement depending on the specific type of patient support apparatus 30. For example, when the patient support apparatus 30 is a wheelchair, the patient support apparatus 30 may comprise two front non-driven caster assemblies 58 and two rear driven caster assemblies 58.

Additionally, one or more auxiliary wheels 66 (powered or non-powered), which may be movable between stowed positions and deployed positions, may be coupled to the support structure 32. In some cases, when these auxiliary wheels 66 are located between the caster assemblies 58 and contact the floor surface in the deployed position, they cause two of the caster assemblies 58 to be lifted off the floor surface thereby shortening a wheel base of the patient support apparatus 30. Such auxiliary wheels 66 may also be arranged substantially in a center of the base 34.

The patient support apparatus 30 comprises a controller 68 in communication with and for controlling any suitable components of the patient support apparatus 30, such as the electrical or electromechanical components described herein. The controller 68 may comprise any suitable signal processing means, computer executable instructions or software modules stored in non-transitory memory wherein the executable instructions or modules may be executed by a processor, or the like. Additionally, or alternatively, the controller 68 may comprise a microcontroller, a processor, one or more integrated circuits, logic parts, and the like for enabling the same. The controller 68 may have any suitable configuration for enabling performance of various tasks related to operation of the patient support apparatus 30, such as those described below. The controller 68 may be located at any suitable location of the patient support apparatus 30.

Figure 2:
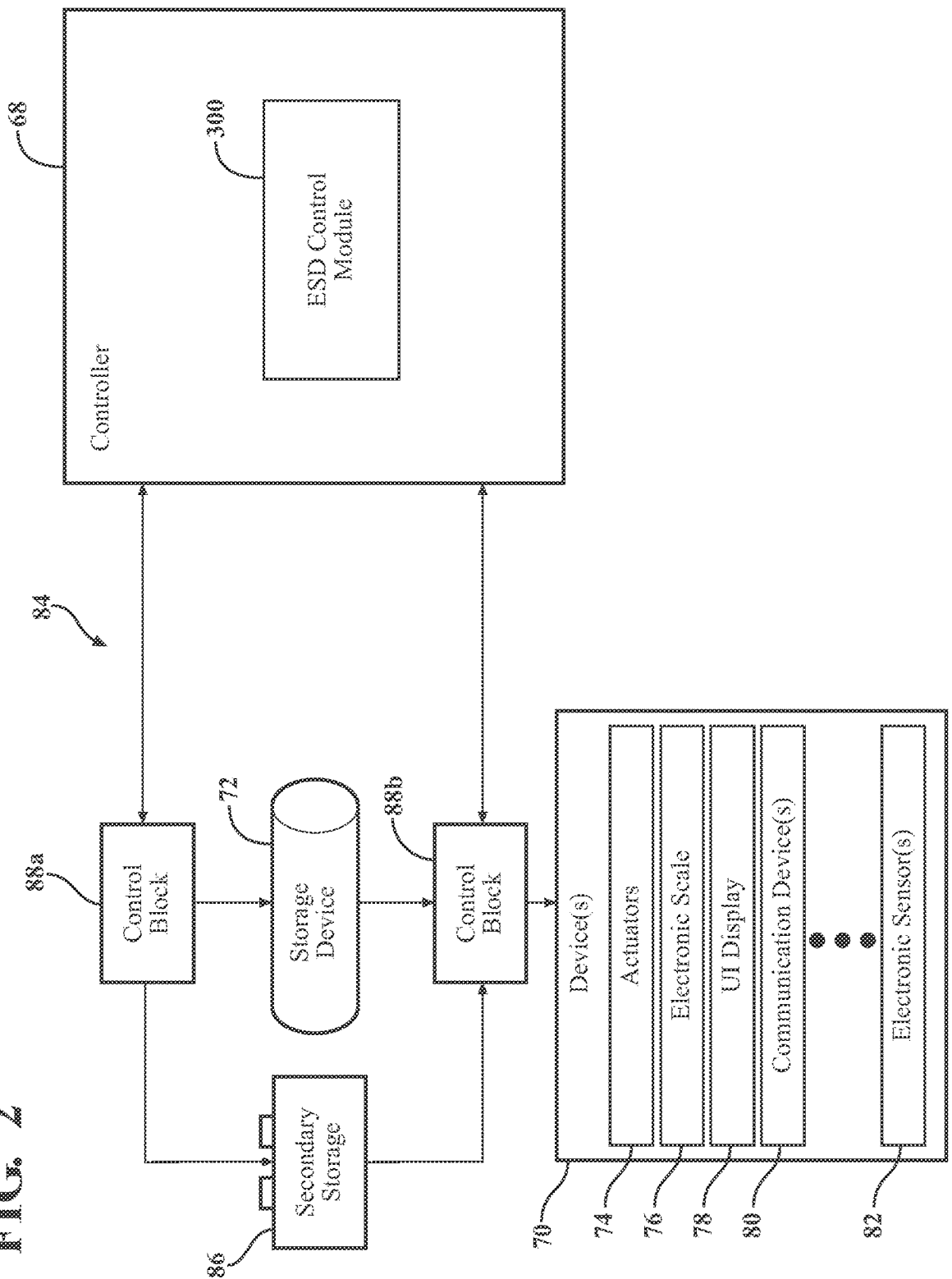
FIG. 2 is a block diagram of an electrical distribution system and electrical components of the patient support apparatus according to one embodiment.

Referring to FIG. 2, a system block diagram of one example of a power system for the patient support apparatus 30 is provided. The patient support apparatus 30 comprises one or more electrical devices 70. The electrical device 70 is a device that is actively energized and consumes energy. The electrical device 70 is connected to an energy storage device (ESD) 72, which stores such energy for consumption. The patient support apparatus 30 may comprise any suitable number of powered devices 70. Examples of the powered devices 70 are shown in the block diagram of FIG. 2.

For example, the electrical device 70 may be an actuator 74, such as a motor, for moving the patient support deck 38 in different positions and/or for lifting the intermediate frame 36. The actuator 74 may also be coupled to one or more of the wheels 58, 66 for steering or drive purposes. Additionally, the actuator 74 may be provided for a "pre-swivel" mechanism or a "steer-lock" mechanism. In another example, the electrical device 70 is an electronic scale 76 for detecting patient weight and/or patient presence.

The electrical device 70 may be a user interface (UI) device 78 provided for communicating with the operator and/or accepting user input to enable the operator to control aspects of the patient support apparatus 30. The user interface device 78 may comprise a digital display (e.g., backlit display), buttons, touch-screens, voice activation, or combinations thereof. The user interface device 78 may be mounted to the headboard 52, footboard 54, side rails 44, 46, 48, 50, or any other suitable location on the patient support apparatus 30. The user interface device 78 may also be removably attached to or located remotely from the patient support apparatus 30. The user interface device 78 may have any other suitable configuration for communicating with the operator and/or accepting user input to enable the operator to control aspects of the patient support apparatus 30.

In other examples, the electrical device 70 is a communication unit or device 80 for enabling communication with other components of the patient support apparatus 30 and/or to enable the patient support apparatus 30 to communicate with external communication sources. The communication device 80 may be wireless or wired. Examples of such communication devices 80 include, but are not limited to, transmitters, mobile RF communication devices, receivers, transponders, transceivers, near-field communication devices, antennae, low power IEEE 802.15.1 enabled devices, infrared devices, wireless access points, Wi-Fi devices or modules, and the like. The communication device 80 may have any other suitable configuration for implementing those functions described herein, and those not specifically recited herein.

The electrical device 70 may be any electronic sensor 82 employed by the patient support apparatus 30, including, but not limited to, force sensors (e.g., sensors for any of the headboard 52, footboard 54, and/or side rails 44, 46, 48, 50), steering sensors, brake sensors, speed sensors, position sensors, electronic accelerometers, electronic gyroscopic sensors, potentiometers, strain gauges, capacitive sensors, piezoresistive sensors, proximity sensors (e.g., Hall effect sensors), piezoelectric sensors, GPS sensors, IR sensors, RF sensors, electromagnetic sensors, and combinations thereof. Moreover, the electrical device 70 may be the controller 68 itself.

As shown in FIG. 2, the patient support apparatus 30 comprises an electrical distribution system 84 providing a medium to distribute power to any of the electrical devices 70. The electrical distribution system 84 comprises circuits, wires, fuses, switches, relays, electrical connectors, electrical terminals, junction boxes, circuit boards, and the like, which enable such power distribution and control thereof.

The electrical distribution system 84 may be routed throughout various components of the patient support apparatus 30, such as the support structure, 32, base 34, intermediate frame 36, and/or patient support deck 38. The electrical distribution system 84 may have any configuration desired for adequately distributing power, or enabling control of power delivery, to any of the electrical devices 70.

The ESD 72 is coupled to the electrical distribution system 84. The stored energy in the ESD 72 is distributed to any of the electrical devices 70 through the electrical distribution system 84. The ESD 72, according to one embodiment, exhibits a high or ultra-high energy density. Energy density is the amount of energy stored in per unit volume of the ESD 72. In one example, the energy density is in a range between 1-30 MJ/L.

The ESD 72 may be specifically configured for use with a wireless power transfer (WPT) systems employed by the patient support apparatus 30. With a WPT system, a peak power draw is taken into account wherein the WPT system would require peak current draw above a certain current threshold, e.g., above 10 Amps. High-density ESDs 72, such as the supercapacitors, are capable of storing power for such peak current draw required by the WPT system. When power is needed for the patient support apparatus 30, the high-density ESD 72 can deliver large amounts of power quickly and efficiently with little loss of energy during transfer. The high-density ESD 72 exhibits a long life allowing for hundreds of thousand charging and discharge cycles. Conventional batteries, on the other hand, are bulky and have charge discharge cycles in the five hundred cycle range, or less. In turn, the high-density ESD 72 reduces the overall power transfer required under wireless device use to less than one amp and reduces the need for larger and more expensive battery components and circuitry. Furthermore, the overall energy delivery system of the patient support apparatus 30 is reduced in physical size and the overall cost of the energy delivery system is reduced. Additionally, the ESD 72 often obtains charge originally from the electrical system of the facility in which the patient support apparatus 30 is located. By utilizing such high-density ESDs 72, the overall facility power consumed by the patient support apparatuses 30 in the facility is reduced, in turn, allowing the electrical system of the facility to be less burdened.

The ESD 72 may be designed electrochemically or chemically. In one example, the ESD 72 is a battery. The battery may be a Lithium-ion battery. The Lithium-ion battery may be one or more of a Lithium Cobalt Oxide, Lithium Manganese Oxide, Lithium Iron Phosphate, Lithium Nickel Manganese Cobalt Oxide, Lithium Nickel Cobalt Aluminum Oxide, and Lithium Titanate battery. In other examples, the ESD 72 is a Lithium battery, a Lead-acid battery, or a Nickel-metal hydride battery.

In other examples, the ESD 72 is not a battery, but rather a supercapacitor. The supercapacitor may be electrical or electrostatically based, such as an electric double-layer capacitor (EDLC). In another example, the supercapacitor is a pseudo-capacitor or a hybrid capacitor.

The patient support apparatus 30 may comprise any number of ESDs 72 of the same type. In some embodiments, a second ESD 86, which is of a different type as compared with the first ESD 72. The second ESD 86 is coupled to the electrical distribution system 84. The stored energy in the second ESD 72 may also be distributed to any of the electrical devices 70 through the electrical distribution system 84. Additional techniques involving management of the first and second ESDs 72, 86 are provided below.

The controller 68 may be coupled to the electrical distribution system 84 for controlling power distribution operations. Specifically, the electrical distribution system 84 may comprise one or more control blocks 88a-88b for controlling power distribution. Any of the control blocks 88a-88b described herein may be disposed on a device separate from the controller 68 or may be integrated within the controller 68 itself. In either scenario, the controller 68 can provide selective control over the control blocks 88a-88b, for purposes such as enabling or disabling power distribution through certain pathways. The control blocks 88a-88b may comprise any suitable switches (e.g., transistors), integrated circuits, and other electrical components for enabling power distribution control. Additionally, or alternatively, the control block may be a software block or module.

In FIG. 2, control block 88a is disposed between the controller 68 and an input side of the ESDs 72, 86 to selectively activate and/or deactivate the ESDs 72, 86, or control charging to the same. Control block 88b is disposed between an output side of each of the ESDs 72, 86 and one or more of the electrical devices 70 to control distributed power output to the electrical devices 70 individually. The power distribution system 84 and control blocks 88a, 88b may have any configuration other than that shown in FIG. 2, or described above.

II. ESD Swapping

Techniques are described herein, which provide seamless ESD 72 management, thereby requiring less attention from caregivers for maintenance of the ESD 72. In other words, distraction of the caregiver in attending to the replacing or charging an ESD 72 is reduced, allowing more time for the caregiver to attend to patient care, or other important matters. The techniques described herein further reduce the need to provide the patient support apparatus 30 with a burdensome power cord for charging the ESD 72. As will be appreciated from the examples below, caregivers no longer need to manually plug a power cord to an electrical outlet (or station) for charging the ESD 72. Furthermore, with the ESD 72 management techniques described herein, the patient support apparatus 30 can remain available for use for longer periods.

The patient support apparatus 30 provides means for enabling swapping or easy replacement of the ESD 72 or any number of ESDs 72. Such swapping may be needed to replace the ESD 72 when the ESD is low on charge or life. Swapping may also be useful to maintain the overall charge level among a plurality of ESDs 72 above a certain threshold. The ESD 72 is provided on the patient support apparatus 30 in a plug-and-play manner.

To enable such swapping, the patient support apparatus 30, as shown in FIG. 1, for example, comprises one or more receptacles 100 being configured to house one or more ESDs 72. As shown in the example of FIG. 1, the patient support apparatus 30 comprises two receptacles 100 for respectively housing two ESDs. However, any number of receptacles 100 may be used for housing any number of ESDs 72. For example, one receptacle 100 may house a plurality of ESDs 72.

The receptacle 100 is coupled to any suitable location on the patient support apparatus 30 that enables the ESD 72 to be readily accessible. In one example, as shown in FIG. 1, the receptacle 100 is coupled to the support structure 32, and more specifically, the base 34. In other embodiments, the receptacle 100 may be coupled to any of the headboard 52, footboard 54, and Side rails 44, 46, 48, 50. The receptacle 100 may be disposed on, or integrated in, any of the components of the patient support apparatus 30, such as those described.

Figure 3:
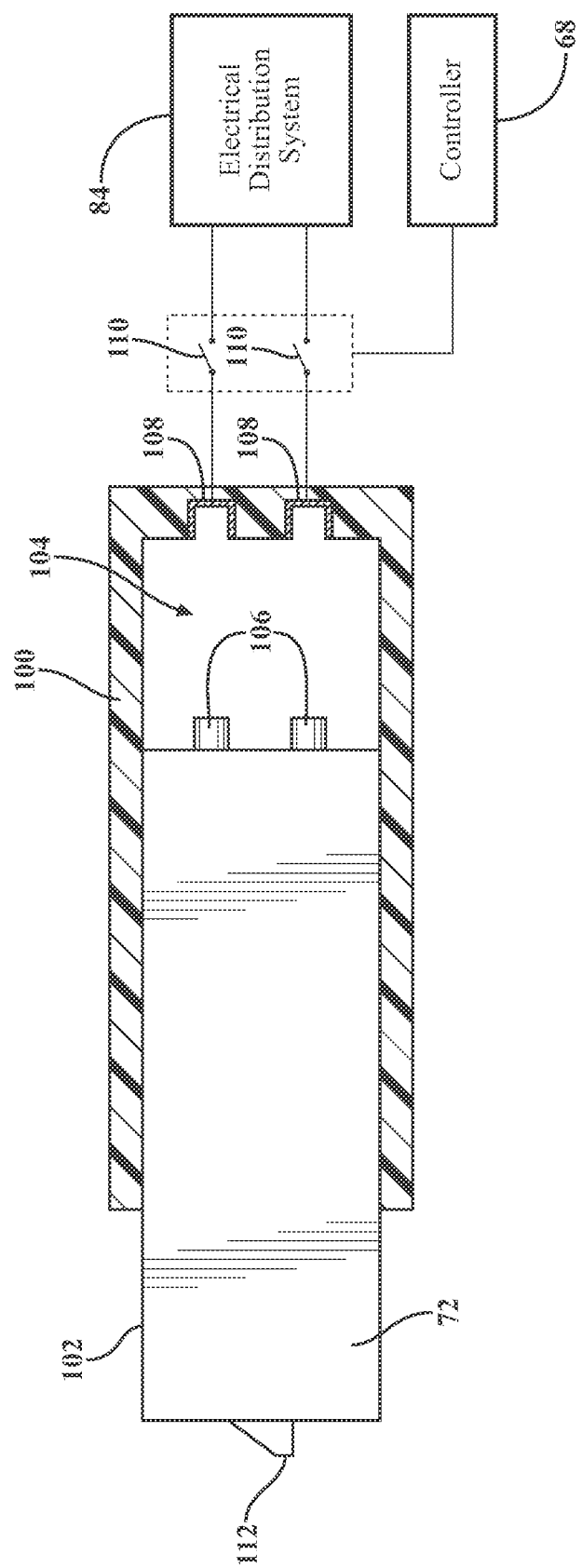
FIG. 3 is a cross-sectional view of the energy storage device disposed relative to a receptacle of the patient support apparatus and further showing components or systems that are coupled to the receptacle.

Referring to one example, in FIG. 3, a cross-sectional view of the ESD 72 and the receptacle 100 are shown. As shown, the ESD 72 comprises a casing 102 for housing components and/or materials of the ESD 72 that are designed to store energy. The receptacle 100 defines a slot 104 that receives the ESD 72, and more specifically, the casing 102. Here, the ESD 72 is shown as being partially slid into the slot 104.

The slot 104 may be any suitable size for receiving the casing 102. In one example, the slot 104 conforms to the casing 102 such that ESD 72 is secured from movement when installed in the receptacle 100. In one embodiment, the slot 104 is defined such that the casing 102 substantially occupies the slot 104 when the receptacle 100 receives the ESD 72. Alternatively, the casing 102 may occupy a portion of the slot 104 such that other portions of the casing 102 are outside of the receptacle 100.

As shown in FIG. 3, the ESD 72 comprises electrical contacts 106 for enabling charging or discharging of energy from the ESD 72. Two electrical contacts 106 are shown in this example. However, any number of electrical contacts 106 may be utilized depending on the configuration of the ESD 72 and/or the number of ESDs 72 housed by a single receptacle 100. Furthermore, the electrical contacts 106 may be any suitable shape or configuration depending on the type of the ESD 72, and the like.

The receptacle 100 has electrical contacts 108 configured to interface with the electrical contacts 106 of the ESD 72. The electrical contacts 106, 108 couple when the receptacle 100 receives the ESD 72. In one embodiment, the electrical contacts 108 of the receptacle 100 conform to the electrical contacts 106 of the ESD 72. For example, in FIG. 3, the electrical contacts 108 of the receptacle 100 define openings for receiving the electrical contacts 106 projecting from the casing 102 of the ESD 72. However, the opposite of this configuration may be utilized. In other examples, one or more electrical contacts 108 of the receptacle 100 comprise a biasing member for establishing contact with the electrical contacts 106 of the ESD 72. Two electrical contacts 108 of the receptacle 100 are shown in this example. However, any number of electrical contacts 108 may be utilized and such electrical contacts 108 may be of any suitable shape or type.

The electrical contacts 108 of the receptacle 100 are coupled to the electrical distribution system 84 of the patient support apparatus 30. As such, when the ESD 72 is fully engaged with the receptacle 100, and the electrical contacts 106, 108 interface with one another, the ESD 72 becomes coupled to the electrical distribution system 84. From here, the ESD 72 can be discharged through the receptacle 100 to power the one or more electrical devices 70 through the electrical distribution system 84. Additionally or alternatively, the ESD 72 can be charged through the receptacle 100 to increase energy stored therein.

Furthermore, the controller 68 may be coupled to the electrical contacts 108 of the receptacle 100 for actively controlling operation of the ESD 72 when installed in the receptacle 100. For example, the controller 68 may selectively disconnect the electrical contacts 108 of the receptacle 100 from the electrical distribution system 84 using switches 110 to prevent the ESD 72 from powering the one or more electrical devices 70, and vice-versa To further enable easy swapping of the ESD 72 to and/or from the patient support apparatus 30, the ESD 72 comprises a first interface 112 configured to allow easy handling of the ESD 72. The first interface 112 is configured to be physically engaged for removal of the ESD 72 from the receptacle 100 and/and for insertion of the ESD 72 into the receptacle 100.

The first interface 112 is coupled to the casing 102 and may be mechanically attached to the casing 102 or integrated with the casing 102. The first interface 112 is configured to structurally support the weight of the ESD 72 when the ESD 72 is physically engaged by the first interface 112. As shown in FIGS. 1 and 3, the first interface 112 is embodied as a handle. Other examples of the first interface 112 are described below.

The first interface 112 located in any suitable location on the ESD 72 depending on the shape of the ESD 72 and/or the shape of the receptacle 100. In one example, the first interface 112 is located such that when the ESD 72 is disposed in the receptacle 100, the first interface 112 remains exposed to allow accessibility for physically engagement. The first interface 112 may have any other suitable configuration for enabling swapping of the ESD 72 to and/or from the patient support apparatus 30. Furthermore, any number of first interfaces 112 may be utilized for the ESD 72, and may be of a common or different configuration from one another.

As will be appreciated from the examples below, the patient support apparatus 30 may utilize an ESD 72b that was initially located remote from the patient support apparatus 30 and later provided on the patient support apparatus 30 to supplement and/or to replace existing ESDs 72. For simplicity, ESDs 72b of this nature are referred to as replacements ESDs 72b below. It should be appreciated that the replacements ESD 72b may be the same or different type as existing ESDs 72a on the patient support apparatus 30. Furthermore, any of the existing ESDs 72a on the patient support apparatus 30 may have formally been a replacement ESD 72b, i.e., before being installed on the patient support apparatus 30. Any of the features, structure, and/or functions of the ESD 72a may be applied fully to any replacement ESD 72b described herein.

With the understanding of the patient support apparatus 30, as described, a system 120 is provided that includes the patient support apparatus 30 in conjunction with a unit 122 that is independent from the patient support apparatus 30. The unit 122 is configured to interact autonomously with the patient support apparatus 30. Specifically, the unit 122 is configured to autonomously remove the ESD 72a from the patient support apparatus 30 and/or to autonomously place the replacement ESD 72b on to the patient support apparatus 30. The unit 122 may also be understood as a swapping unit or an ESD swapper.

As will be appreciated from the examples below, the autonomous nature of the unit 122 may be understood as being fully or semi-autonomous. When fully autonomous, the caregiver need not perform any preliminary tasks to enable the unit 122 to perform autonomous swapping. In other words, the unit 122 is configured to approach the patient support apparatus 30 autonomously and perform autonomous swapping, even if, for example, the caregiver is not near the patient support apparatus 30. When semi-autonomous, the caregiver may need to perform some preliminary tasks to enable the unit 122 to perform autonomous swapping. For example, such preliminary tasks may include activating the unit 122, signaling to the unit 122 that swapping is desired, and/or moving the patient support apparatus 30 to a location suitable for the unit 122 to perform autonomous swapping. However, with semi-autonomous swapping, the unit 122, and not the caregiver, removes the ESD 72a from the patient support apparatus 30 and/or to places the replacement ESD 72b on to the patient support apparatus 30.

As will be understood from the embodiments herein, the unit 122 may be of various configurations. For example, in the embodiment of FIG. 7, the unit 122 comprises a robotic device 124 that is stationary and autonomously configured to remove the ESD 72a and/or to place the replacement ESD 72b. In the embodiment of FIG. 8, the unit 122 comprises a mobile device 126 autonomously configured to approach the patient support apparatus 30 to remove the ESD 72a and/or to place the replacement ESD 72b. In the embodiment of FIG. 9, the unit 122 comprises a docking system 128 configured to enable docking between the patient support apparatus 30 and the unit 122 for autonomously removal of the ESD 72a and/or placement the replacement ESD 72b. These embodiments will be described in detail below. The unit 122 may comprise any combination of the embodiments described herein. Furthermore, the unit 122 may comprise embodiments for autonomously removing the ESD 72a from the patient support apparatus 30 and/or for autonomously placing the replacement ESD 72b on to the patient support apparatus 30 other than those described herein.

The unit 122 is configured to physically engage the ESD 72 to enable autonomous removal or installing of the same. In one example, the unit 122 may physically engage the casing 102 of the ESD 72 without regard to the first interface 112. For instance, the unit 122 may slide a mechanism below, or around, the ESD 72 for sliding the ESD 72 into and out of the patient support apparatus 30.

In another example, the unit 122 may engage the ESD 72 by physically engaging the first interface 112 of the ESD 72. In such configurations, the unit 122 may comprise a second interface 130 configured to physically engage the first interface 112. The first and second interfaces 112, 130 may be mechanical interfaces that are configured to mechanically interlock. In other examples, the first and second interfaces 112, 130 may be magnetic, electromagnetic, or the like.

Figure 4A:
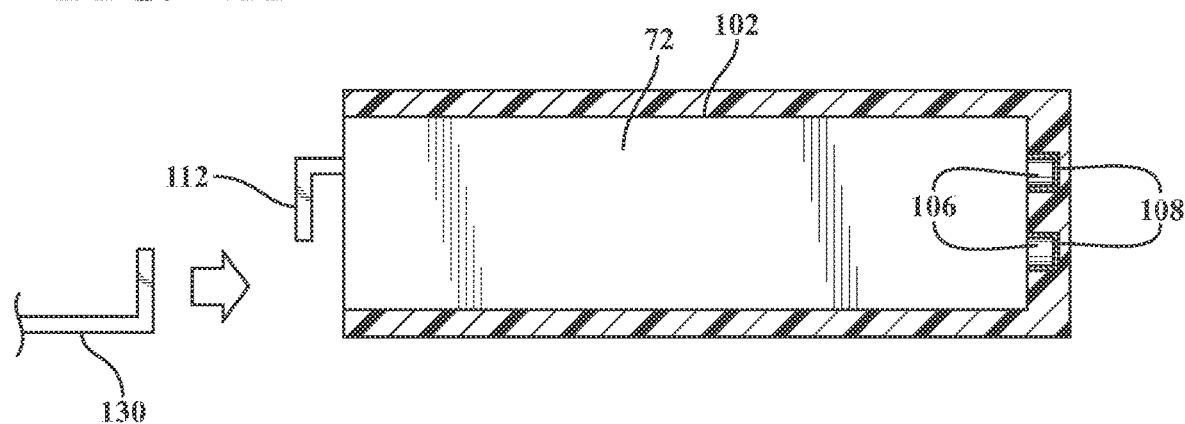
FIGS. 4A-4C are cross-sectional views progressively showing interaction between an interface of the energy storage device and an interface of a swapping unit that is configured to remove or install the energy storage device, according to one embodiment.
Figure 4B:
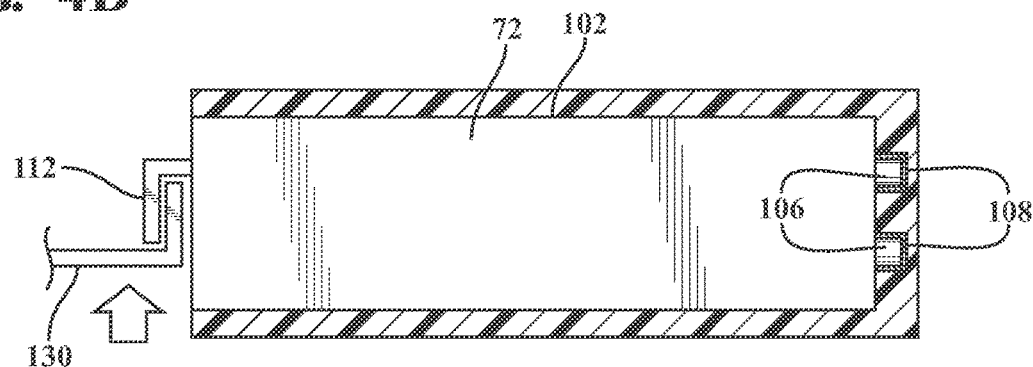
Figure 4C:
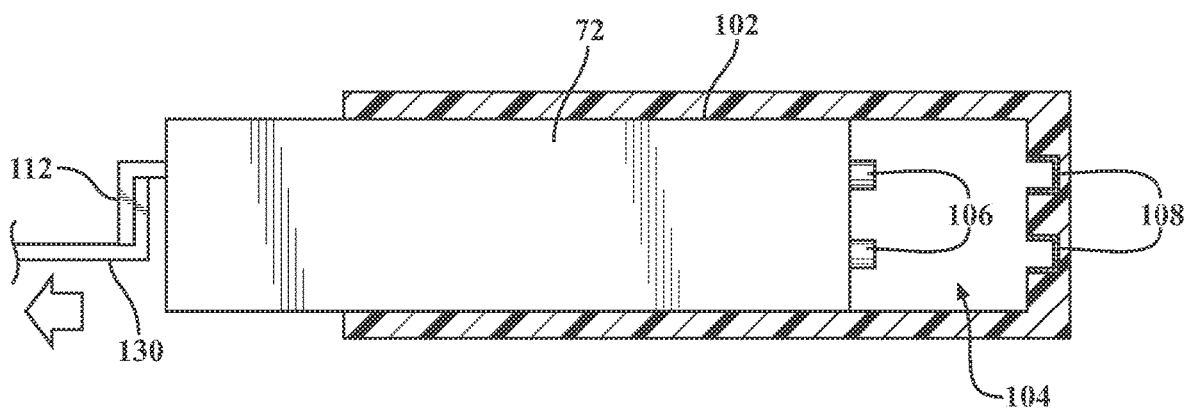

In one embodiment, the second interface 130 is embodied as a static mechanical member. For example, as shown in FIGS. 4A-4C, the static mechanical member is a hooking plate. For simplicity in illustration, only the second interface 130 of the unit 122 is shown. The first interface 112 in this example comprises an opposing mechanical member, such as an opposing plate, which is capable of being engaged by the hooking plate.

In FIG. 4A, the unit 122 autonomously moves the hooking plate towards the first interface 112 of the ESD 72 disposed in the receptacle 100. The unit 122 orients the hooking plate at a level that would enable the hooking plate to avoid collision with the first interface 112. In FIG. 4B, the unit 122 autonomously moves the hooking plate behind the first interface 112 and elevates the hooking plate such that the hooking plate contacts and interlocks with the first interface 112. Once this physical contact is made, the unit 122, in FIG. 4C, autonomously pulls the hooking plate such that the hooking plate applies force to the first interface 112 to pull the ESD 72 from the receptacle 100. Those skilled in the art appreciate that the first and second interfaces 112, 130 may embody static mechanical members other than those shown in FIG. 4. Furthermore, FIGS. 4A-4C show autonomous removal of the ESD 72 from the patient support apparatus 30. However, FIGS. 4A-4C, when viewed in reverse order and with reverse directionality, can be understood to show autonomous installation of the ESD 72 on to the patient support apparatus 30.

Figure 5A:
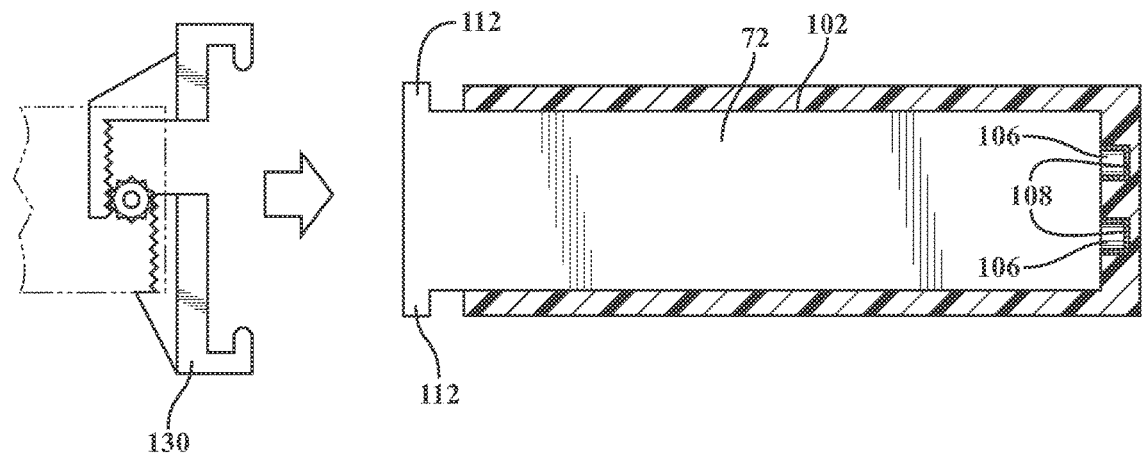
FIGS. 5A-5C are cross-sectional views progressively showing interaction between the interface of the energy storage device and the interface of the swapping unit, according to another embodiment.
Figure 5B:
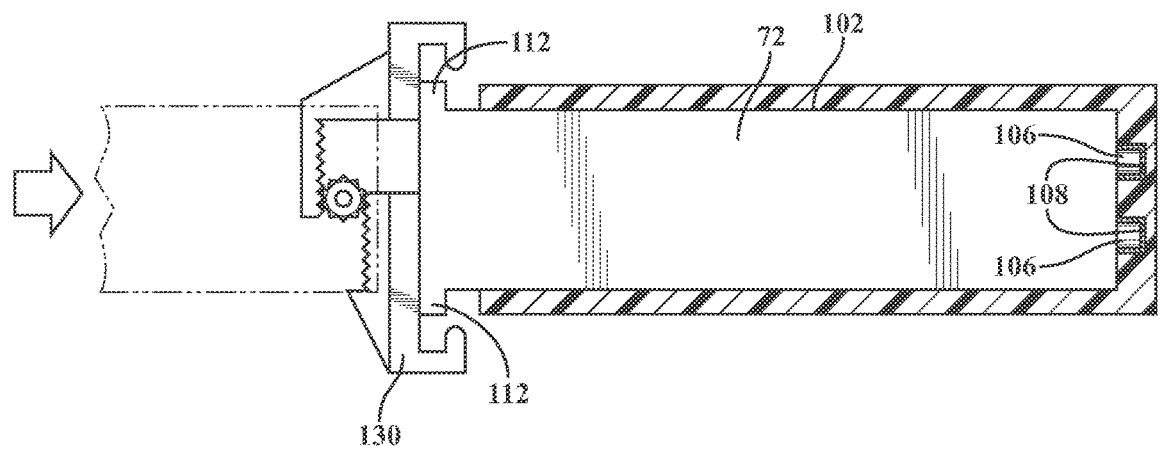
Figure 5C:
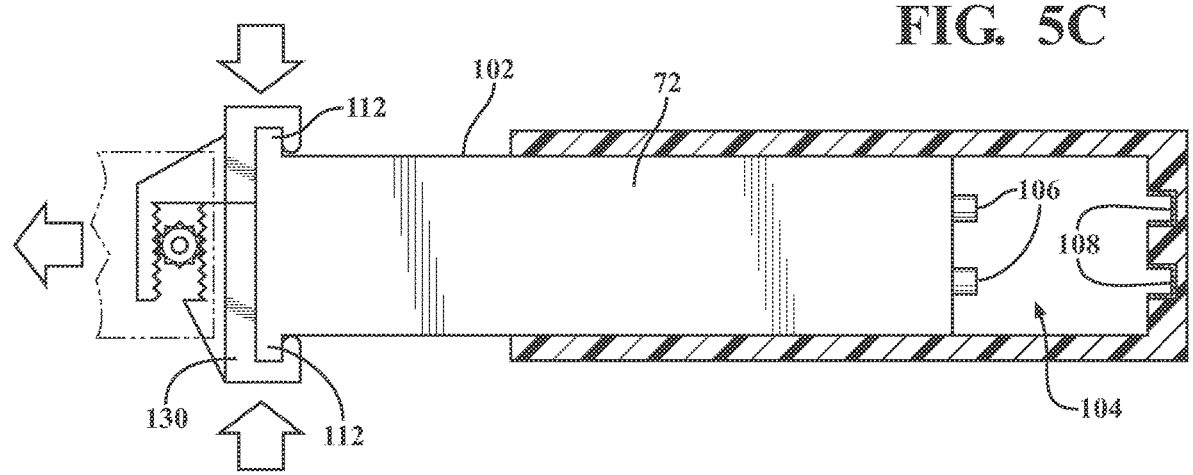

In another embodiment, the second interface 130 is embodied as a gripping device. For example, as shown in FIGS. 5A-5C, the gripping device is a mechanically movable device that is configured to move between a gripped and an un-gripped positon. The gripping device may be actuated mechanically and/or electrically. In one example, the gripping device is provided on the robotic device 124 of the embodiment of FIG. 7. The first interface 112 in this example comprises one or more protrusions integrally formed in the casing 102, which are capable of being engaged by the gripping device. Such protrusions may or may not be specifically designed for gripping by the gripping device. For example, such protrusions may exist for purposes such as casing 102 aesthetic design, enabling proper installation of the ESD 72 in the receptacle 100, and/or for securing the ESD 72 in the receptacle 100.

In FIG. 5A, the unit 122 autonomously moves the gripping device towards the first interface 112 of the ESD 72 disposed in the receptacle 100. The unit 122 orients the gripping device to align the gripping device with the protrusions. In FIG. 5B, the unit 122 autonomously moves the gripping device past the protrusions in the un-gripped position. Once in this position, the unit 122, in FIG. 5C, autonomously closes the gripping device to the gripped position such that the gripping device contacts and interlocks with the protrusions. Once this physical contact is made, the unit 122 autonomously pulls the gripping device such that the gripping device applies force to the protrusions to pull the ESD 72 from the receptacle 100. Those skilled in the art appreciate that the first interface 112 may embody protrusions of any configuration other than that shown in FIG. 5. Additionally or alternatively, the first interface 112 may define openings or notches to enable physical engagement the second interface 130. Furthermore, the second interface 130 may embody gripping devices other than those shown in FIG. 5. For example, such gripping devices may be an adjustable strap device, a robotic hand, or the like. Again, FIGS. 5A-5C show autonomous removal of the ESD 72 from the patient support apparatus 30. However, FIGS. 5A-5C, when viewed in reverse order and with reverse directionality, can be understood to show autonomous installation of the ESD 72 on to the patient support apparatus 30.

In yet another embodiment, the second interface 130 is embodied as a connector. For example, as shown in FIG. 6, the connector is configured to mechanically connect to the first interface 112. More specifically, the connector in FIG. 6 is a threaded female connector (e.g., nut) that is driven, mechanically and/or electrically, by the unit 122. The first interface 112 in this example comprises a threaded male connector (e.g., bolt) conforming to the female connector. The connectors may be of opposite configuration from that shown in FIG. 6. Furthermore, one of the first and second interfaces 112, 130 may comprise a connector, while the other does not. Additionally, the connectors may take any form other than that shown in FIG. 6.

Figure 6A:
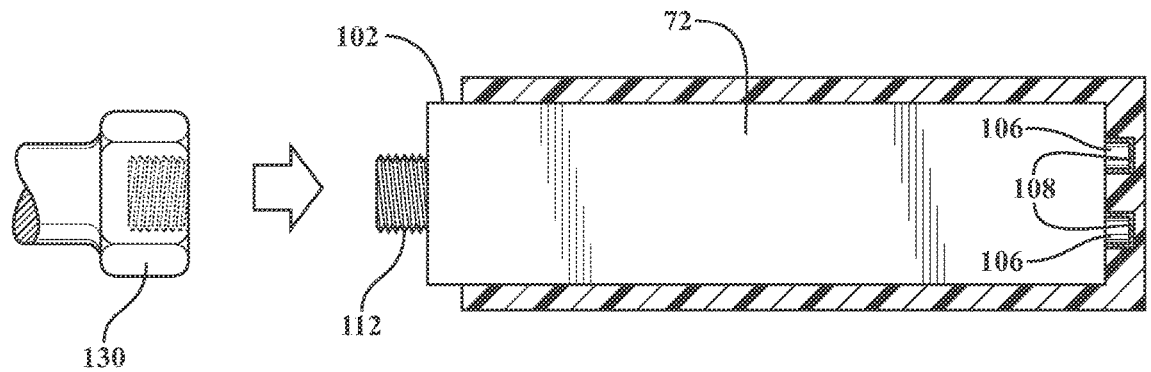
FIGS. 6A-6C are cross-sectional views progressively showing interaction between the interface of the energy storage device and the interface of the swapping unit, according to yet another embodiment.
Figure 6B:
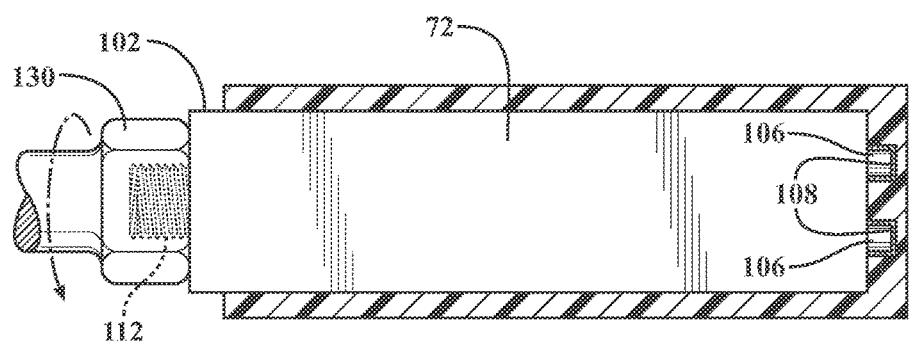
Figure 6C:
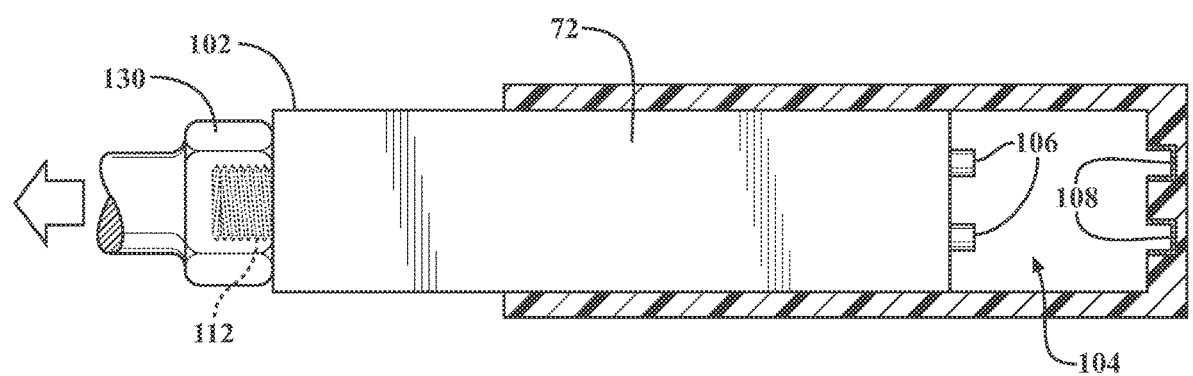

In FIG. 6A, the unit 122 autonomously moves the female connector towards the first interface 112 of the ESD 72 disposed in the receptacle 100. The unit 122 orients the female connector to align the female connector with the male connector. In FIG. 6B, the unit 122 autonomously moves the female connector such that it contacts the male connector. Once in this position, the unit 122 autonomously rotates the female connector such that threads of the connectors engage one another to interlock the female connector to the ESD 72. Once this interlock is made, the unit 122 autonomously pulls the female connector such that the female connector applies force to the male connector to pull the ESD 72 from the receptacle 100. Those skilled in the art appreciate that the first interface 112 may embody protrusions of any configuration other than that shown in FIG. 6. Again, FIGS. 6A-6C show autonomous removal of the ESD 72 from the patient support apparatus 30. However, FIGS. 6A-6C, when viewed in reverse order and with reverse directionality, can be understood to show autonomous installation of the ESD 72 on to the patient support apparatus 30.

The second interface 130 of the unit 122 may physically engage the first interface 112 of the ESD 72 according to examples other than those shown in FIGS. 4-6. Furthermore, different ESDs 72 may comprise different types of first interfaces 112. Furthermore, any given ESD 72 may comprise any combination of first interfaces 112, which may be common or different from one another. Additionally, the unit 122 may be configured to interchange second interfaces 130 upon detection of the first interface 112 provided on the ESD 72.

The unit 122 comprises a controller 132 in communication with and for controlling any suitable components of the unit 122, such as the electrical or electromechanical components described herein. The controller 132 may comprise any suitable signal processing means, computer executable instructions or software modules stored in non-transitory memory wherein the executable instructions or modules may be executed by a processor, or the like. Additionally, or alternatively, the controller 132 may comprise a microcontroller, a processor, one or more integrated circuits, logic parts, and the like for enabling the same. The controller 132 may have any suitable configuration for enabling performance of various tasks related to operation of the unit 122 such as those described below. The controller 132 may be located at any suitable location of the unit 122. Additional functionality of the controller 132 will be understood from the various embodiments described herein.

The unit 122 may also comprise and/or interact with a charging station 134. The charging station 134 is configured to charge replacement ESDs 72b. The charging station 134 may be coupled to the controller 132 such that the controller 132 can monitor and control charge delivered to the replacements ESDs 72b. The charging station 134 may be integrated with the unit 122 or coupled thereto. In other embodiments, the charging station 134 is remote from the unit 122, but the unit 122 may be configured to autonomously locate and deposit and/or remove ESDs to/from the charging station 134. For example, the charging station 134 may be coupled to a wall or a floor surface of the facility and many charging stations 134 may be located throughout the facility.

In one example, the charging station 134 comprises a receptacle 136 for housing the replacement ESD 72b. The unit 122 is configured to autonomously place the ESDs 72a into the receptacle and/or to autonomously remove the replacement ESD 72b from the receptacle. The receptacle 136 of the charging station 134 comprises electrical contacts 138 coupled to a power source. The electrical contacts 138 of the charging station 134 interface with the electrical contacts 106 of the replacement ESD 72b to enable the power source to electrically charge the same.

The receptacle 136 of the charging station 134 may have a configuration or functionality according to any of the configurations or functionally of the receptacle 100 of the patient support apparatus 30. The configurations of receptacle 100 apply fully to receptacle 136, and therefore, are not repeated herein for simplicity.

Referring now to FIG. 7, an embodiment is shown wherein the unit 122 is the robotic device 124. The robotic device 124 in FIG. 7 comprises a base 140, a robotic arm 142 that moves relative to the base 140, and the charging station 134. The first interface 130 is coupled to a distal end of the robotic arm 142. The robotic arm 142 may comprise any suitable number of joints and/or links, with motors, to enable the robotic arm 142 to move in any number of degrees of freedom, such as six degrees or freedom, or more. The controller 132 of the unit 122 is in the base 140 of the robotic device 124. The robotic device 124 in this example is stationary. However, the robotic device 124 alternatively may be mobile.

The unit 122, and specifically the robotic device 124, may be coupled to, or may include, a tracking system 144 that is configured to track the position and orientation of the patient support apparatus 30 relative to the unit 122. In the example of FIG. 7, the tracking system 144 is coupled to the base 140 of the robotic device 124. Such tracking systems 144 may include a camera, optical tracking elements, Hall Effect sensors, ultrasonic detection elements, electromagnetic elements, or the like. The tracking system 144 may alternatively track the position and orientation of the ESDs 72. The patient support apparatus 30 may also be configured with elements that facilitate tracking by the tracking system 144. Such elements may include trackers, sensors, markers, and the like. The controller 132 may communicate with the tracking system 144 to coordinate autonomous motion of the unit 122 relative to the patient support apparatus 30. For example, based on continuous data from the tracking system 144, the robotic device 124 in FIG. 7 may iteratively move the arm 142 relative to the ESD 72. The tracking system 144 may have configurations other than those described herein and as shown in the Figures. It should be appreciated that the unit 122 may be autonomously operational without use of the tracking system 144.

Figure 7A:
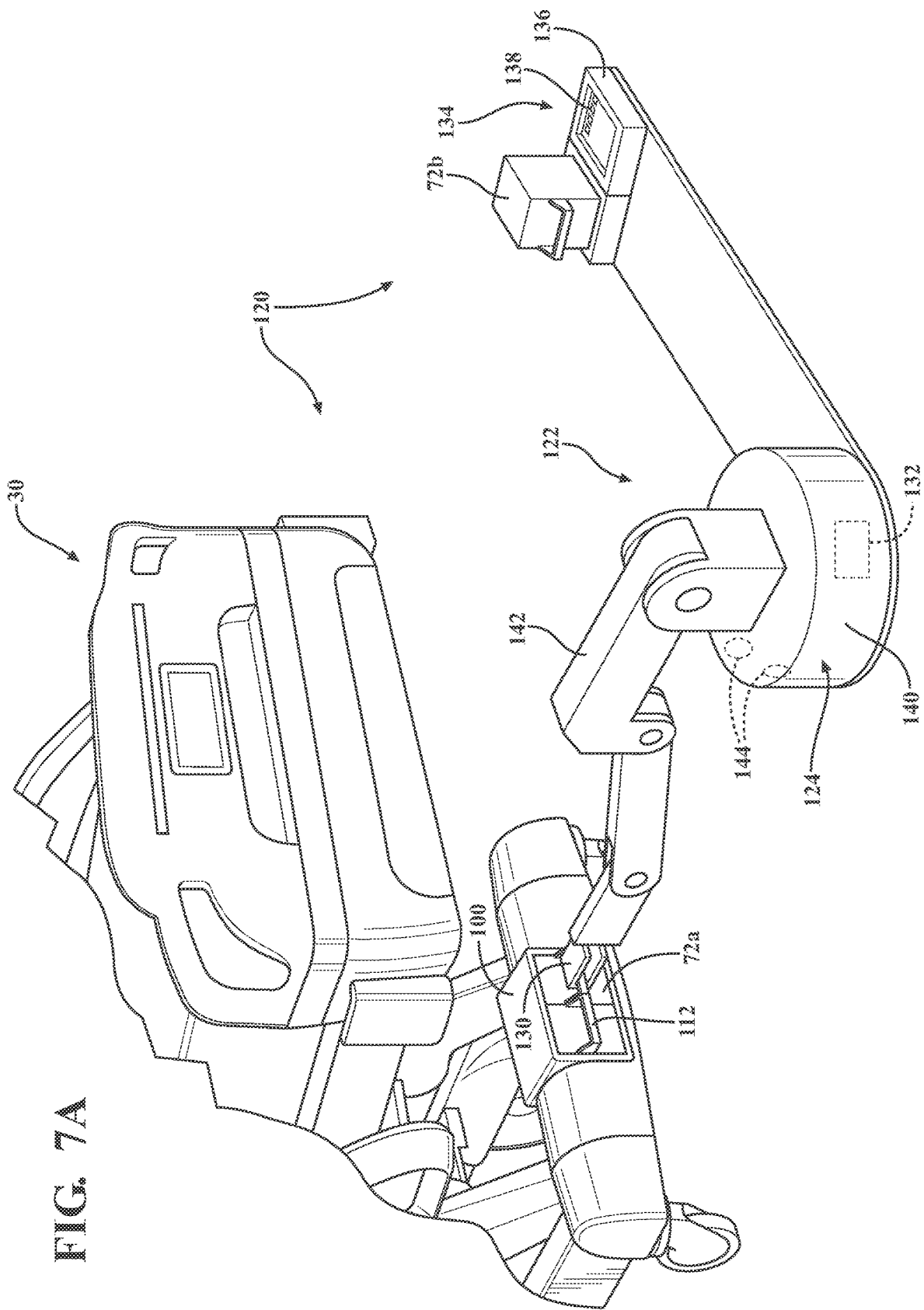

In FIG. 7A, the robotic device 124 detects presence of the patient support apparatus 30 using the tracking system 144. The controller 132 processes tracking data from the tracking system 144 and commands motion of the robotic arm 142 relative to the patient support apparatus 30. The unit 122 may also receive status information over a network about the ESDs 72a of the patient support apparatus 30, for purposes of determining, for example, which ESD 72a in the receptacle 100 requires replacement. Such network communication schemes are described in detail below.

In FIG. 7A, the second interface 130 of the robotic device 124 physically engages the first interface 112 of the ESD 72a, according to any of the techniques described herein. Meanwhile, the replacement ESD 72b is being charged on the charging station 134 coupled to the robotic device 124 such that the replacement ESD 72b is charged at a sufficiently high enough level before installation on the patient support apparatus 30.

Figure 7B:
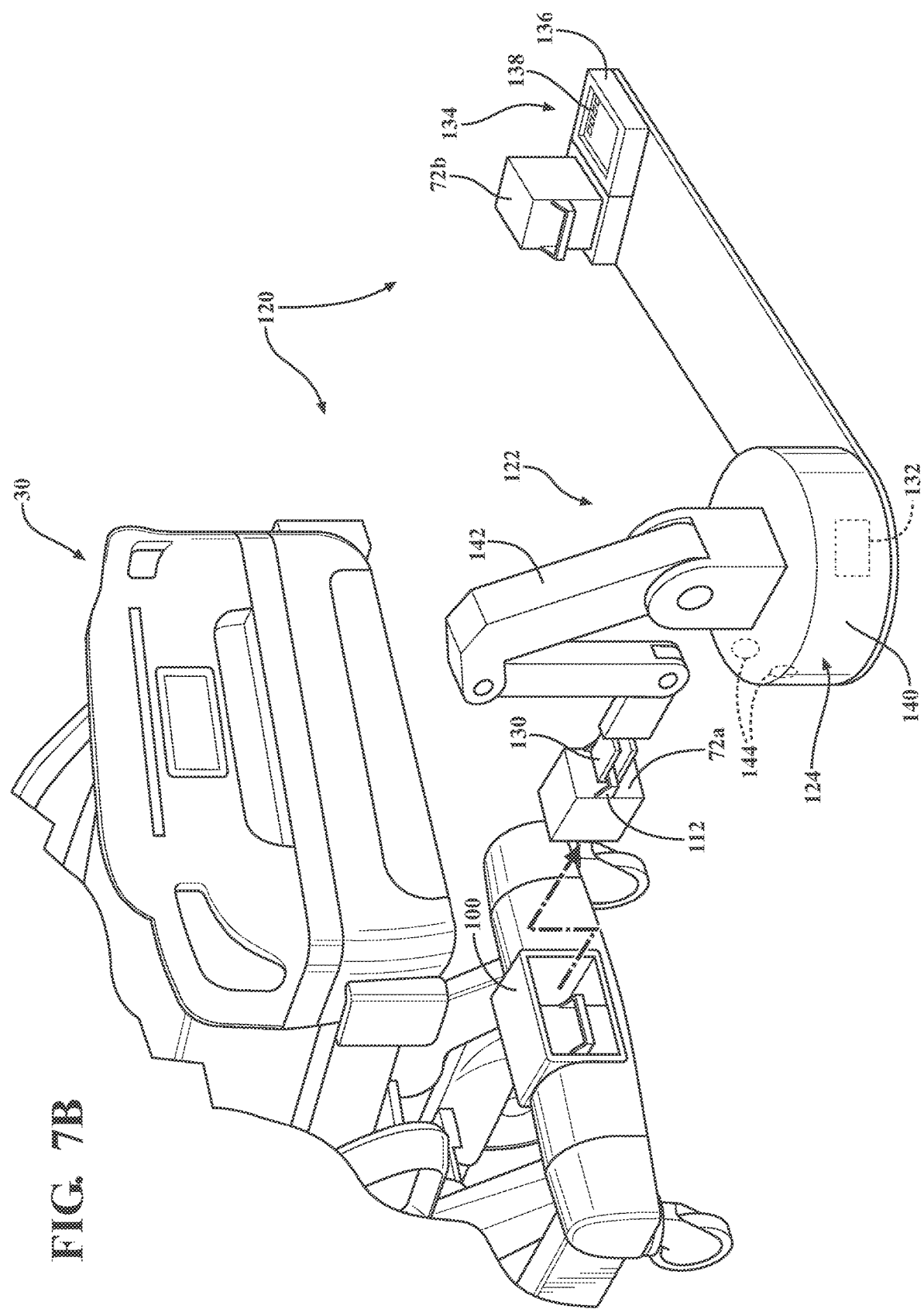

In FIG. 7B, the robotics device 124 autonomously actuates one or motors of the links of the robotic arm 142 to pull the ESD 72a from the receptacle 100. Physical engagement between the interfaces 112, 130 supports the ESD 72a weight load.

Figure 7C:
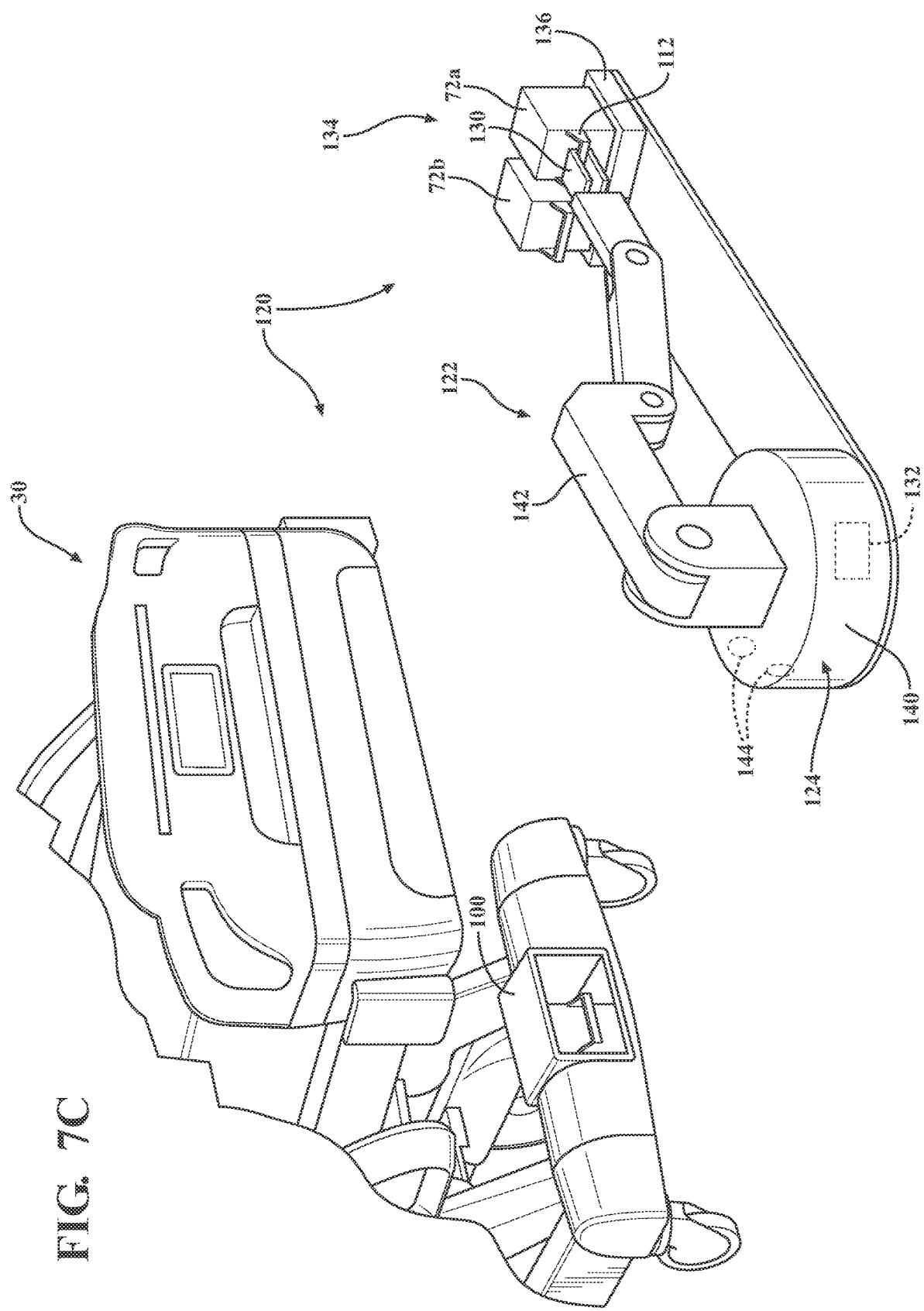

In FIG. 7C, the robotic device 124 actuates the robotic arm 142 to autonomously move the ESD 72a towards the charging station 134. Specifically, the controller 132 may process data to determine which receptacles 136 of the charging station 134 are vacant or occupied by replacement ESDs 72b. Here, the robotic device 124 recognizes that the receptacle 136 on the right of the charging station 134 is vacant, and hence, autonomously places the ESD 72a that was taken from the patient support apparatus 30 in the receptacle 136 of the charging station 134. Once placed, the electrical contacts 106 of the ESD 72b interface with the electrical contacts 138 of the charging station 134 to charge the ESD 72b.

In FIG. 7D, the robotic device 124 uses the second interface 130 to engage the replacement ESD 72b that was on the charging station 134. The robotic arm 142 is actuated to autonomously move the replacement ESD 72b into the receptacle 100 of the patient support apparatus 30 that previously housed ESD 72a. After installation of the replacement ESD 72b, the robotic device 124 disengages the replacement ESD 72b such that the patient support apparatus 30 is free to move disconnected from the robotic device 124.

The robotic device 124, charging station 134, and tracking system 144 may have configurations other than those shown in FIG. 7. Furthermore, the robotic device 124 may perform other autonomous tasks relating to swapping of the ESD 72 other than those tasks shown in FIG. 7. For example, the robotic device 124 may be configured to engage the patient support apparatus 30 to position and/or orient the patient support apparatus 30 to allow unobscured access to the ESDs 72 by the robotic arm 142.

Figure 8A:
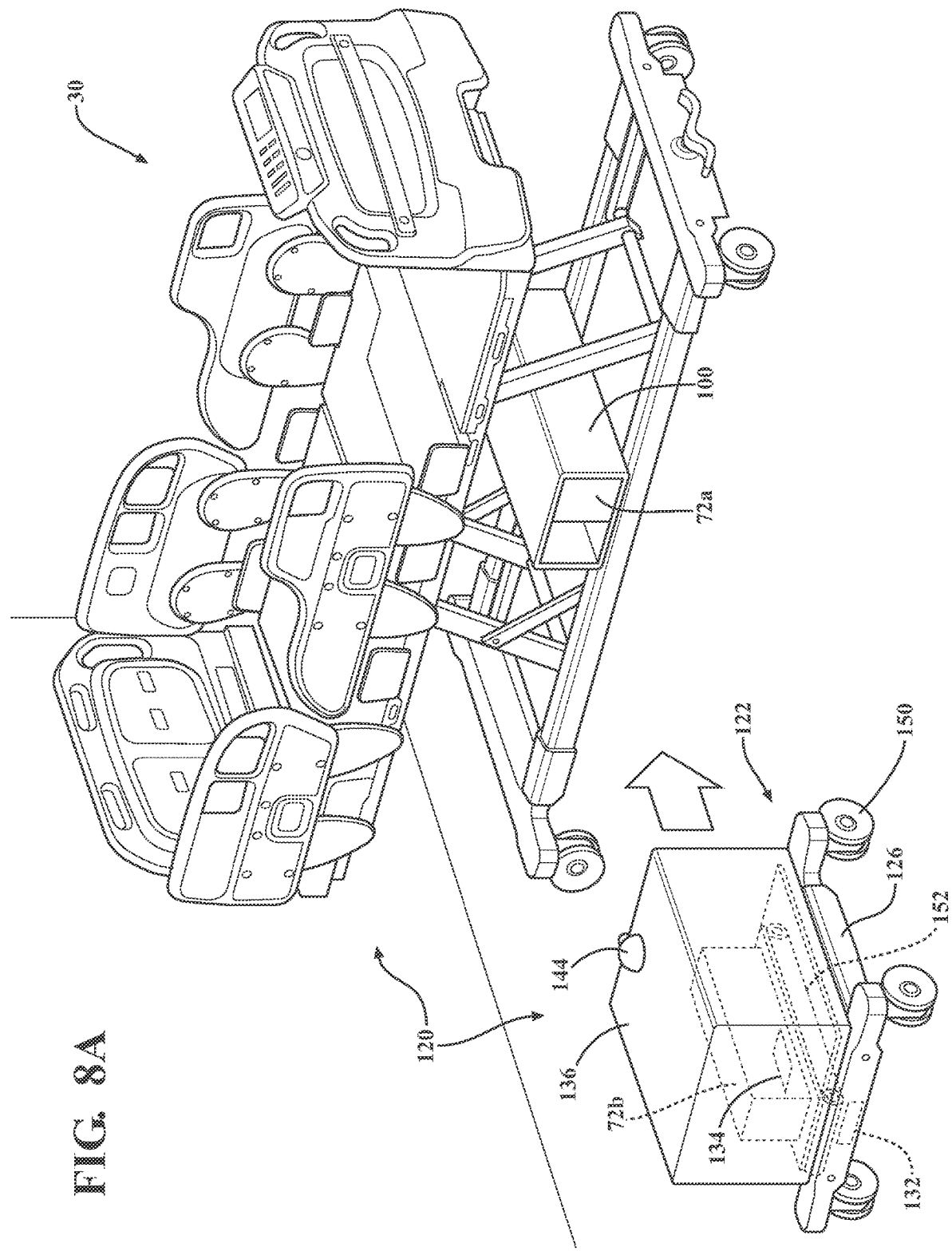
FIGS. 8A-8C are perspective views, partially in phantom, progressively showing interaction between the swapping unit and the patient support apparatus, wherein the swapping unit is embodied as a mobile conveyor unit.

Referring now to FIG. 8, an embodiment is shown wherein the unit 122 is embodied as mobile cart or unit 126. The mobile unit 126 comprises one or more wheels 150 that are autonomously steered and driven to move the mobile unit 126 towards the patient support apparatus 30. The mobile unit 126 in FIG. 8A, is configured to receive tracking information about the patient support apparatus 30 and to autonomously approach the patient support apparatus 30. Tracking information may be provided by the tracking system 144, which in this example, is a camera unit 144 disposed on the mobile unit 126, and/or by communication of tracking data over a network. Examples of such networks and communication schemes are described below.

In FIG. 8A, the mobile unit 126 is shown having the replacement ESD 72b disposed in the receptacle 136, which also provides the charging station 134. Thus, in this example, the charging station 134 is also mobile such that the mobile unit 126 can charge the replacement ESD 72b while moving. In the receptacle 136, the replacement ESD 72b is disposed on a conveyor device 152, which is configured to slide ESDs 72 in and out of the receptacle 136. In FIG. 8, the first and second interfaces 112, 130 may or may not be utilized in addition to the conveyor device 152. Furthermore, devices and techniques for moving the ESDs 72 other than the conveyor device 152 may be utilized.

In this example, the receptacle 100 of the patient support apparatus 30 has one vacancy for placement of the replacement ESD 72b. The other ESD 72a in the receptacle 100 is low on energy and should be removed. Of course, situations for the ESDs 72 other than those shown in the Figures may be fully addressed by the techniques described herein.

Figure 8B:
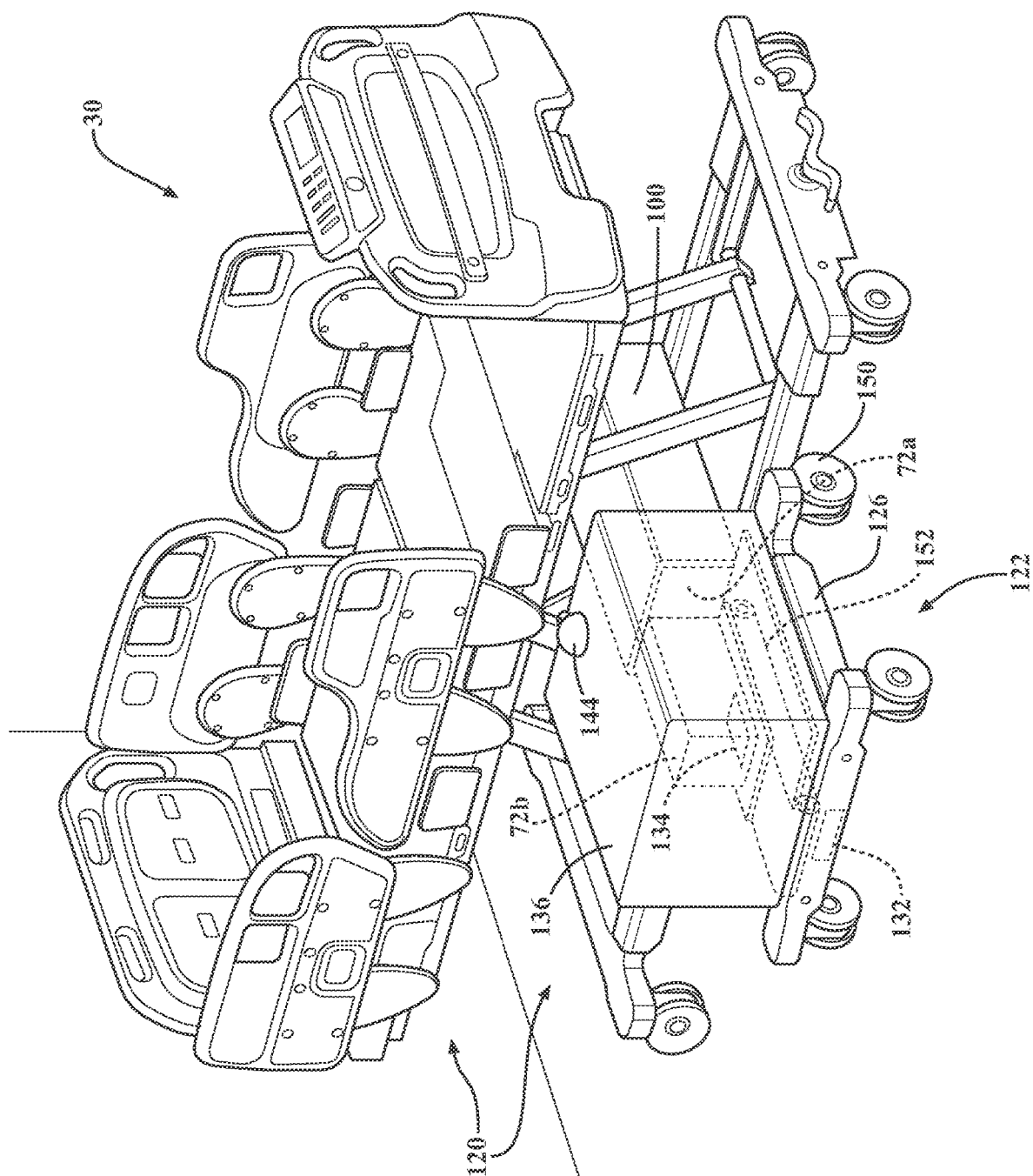

In FIG. 8B, the mobile unit 126 autonomously moves adjacent to the patient support apparatus 30, and more specifically, the receptacle 100. The mobile unit 126 aligns the replacement ESD 72b with the vacancy in the receptacle 100 on the patient support apparatus 30. The conveyor device 152 slides the replacement ESD 72b into the receptacle 100 so that the replacement ESD 72b can connect to the electrical distribution system 84 of the patient support apparatus 30. The conveyor device 152 may comprise supplemental components, such as an extendable member for sliding underneath the ESD 72 when the ESD 72 is partially disposed outside of the receptacle 136.

Figure 8C:
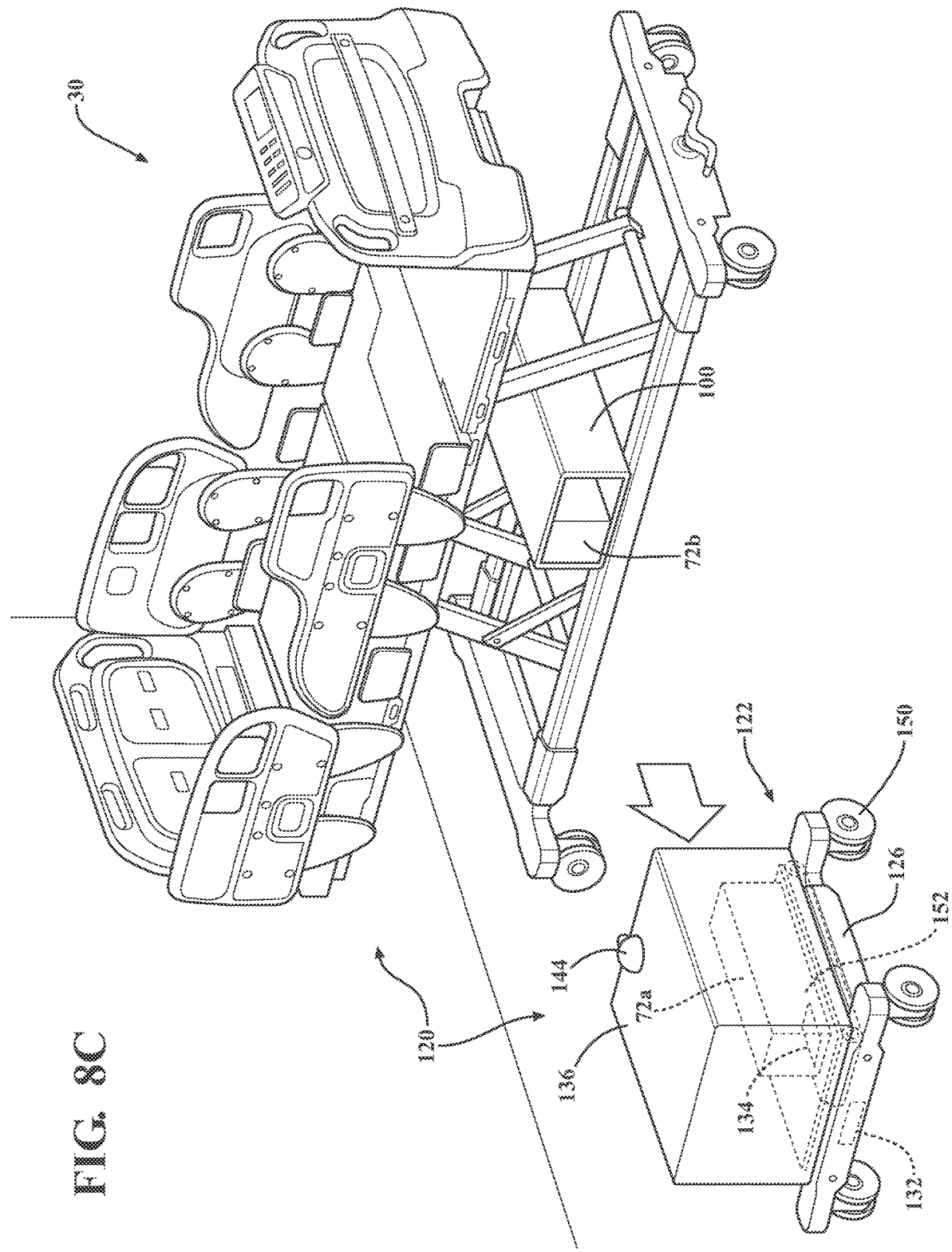

In FIG. 8C, the mobile unit 126 uses the same conveyor device 152 or an adjacent conveyor device to remove the ESD 72a that was on the patient support apparatus 30. For example, the mobile unit 126 may align the second conveyor device 152 with the ESD 72a and slide the extendable member underneath the ESD 72a to slide the ESD 72a out of the receptacle 100. The conveyor device 152 slides the ESD 72a into the receptacle 136 until the ESD 72a couples to the charging station 134 for charging. The mobile unit 126 may have configurations other than those shown in FIG. 8. Furthermore, mobility in the unit 122 may be provided with any of the embodiments described herein or shown in the Figures.

In the embodiment of FIG. 9, the unit 122 comprises a docking system 128 configured to enable docking between the patient support apparatus 30 and the unit 122 for autonomously removal of the ESD 72a and/or placement the replacement ESD 72b. The docking system 128 in this example is stationary, but may be mobile in other configurations. As shown in FIG. 9A, the docking system 128 comprises the charging station 134 disposed in a housing 160.

Figure 9A:
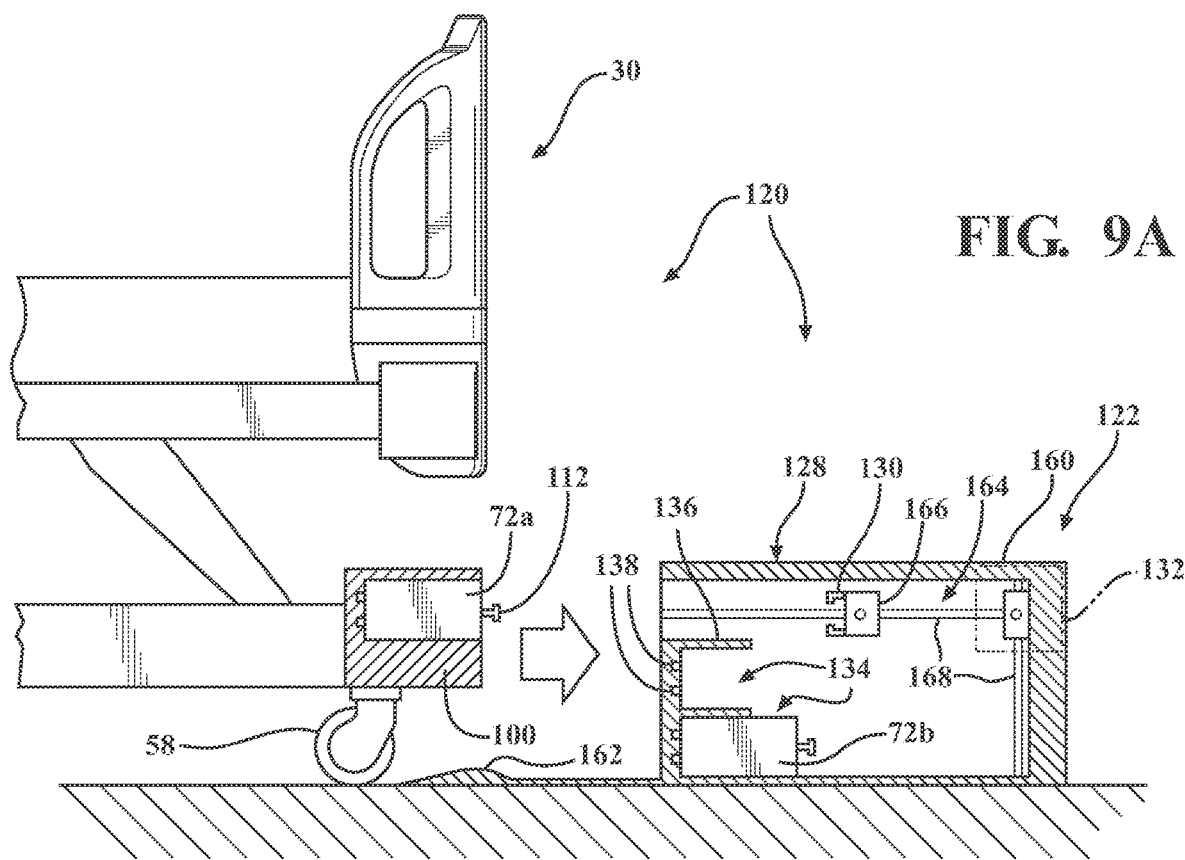
FIGS. 9A-9G, are elevation views, partially in phantom, progressively showing interaction between the swapping unit and the patient support apparatus, wherein the swapping unit is embodied as a robotic docking system.

A docking feature 162 enables the patient support apparatus 30 to be captured by the docking system 128. The docking feature 162 may be integrated with or attached to the docking system 128 or may be separated therefrom. The docking feature 162 may be a passive object or an actively energized device. As shown in FIG. 9A, the docking feature 162 comprises a wedge that is disposed on the floor surface, over which one or more wheels 58, 66 of the patient support apparatus 30 roll over.

The docking system 128 further comprises a machine 164 for physically moving the ESDs 72. The machine 164 in this embodiment comprises a rail unit 166, which moves along or by guide tracks 168. The guide track 168 may be fixed to the housing 160 and/or or coupled to the rail unit 166 such that the rail unit 166 is moved through extension of the guide track 168. The rail unit 166 and/or the guide tracks 168 may comprise motors to enable such movement. The second interface 130 is coupled to the rail unit 166. The docking system 128 in this example is semi-autonomous, thereby requiring the caregiver to dock the patient support apparatus 30 before autonomous management of the ESDs 72 is carried out.

In FIG. 9A, the patient support apparatus 30 is moved towards the docking system 128 for ESD 72 management. The patient support apparatus 30 comprises the receptacle 100 facing the docking system 128. Any designed orientation of the docking system 128 relative to the receptacle 100, and vice-versa, is contemplated. In the receptacle 100, the patient support apparatus 30 comprises the ESD 72a, which in this example, requires replacement. In the housing 160 of the docking system 128, the replacement ESD 72b is being charged on the charging system 134.

Figure 9B:
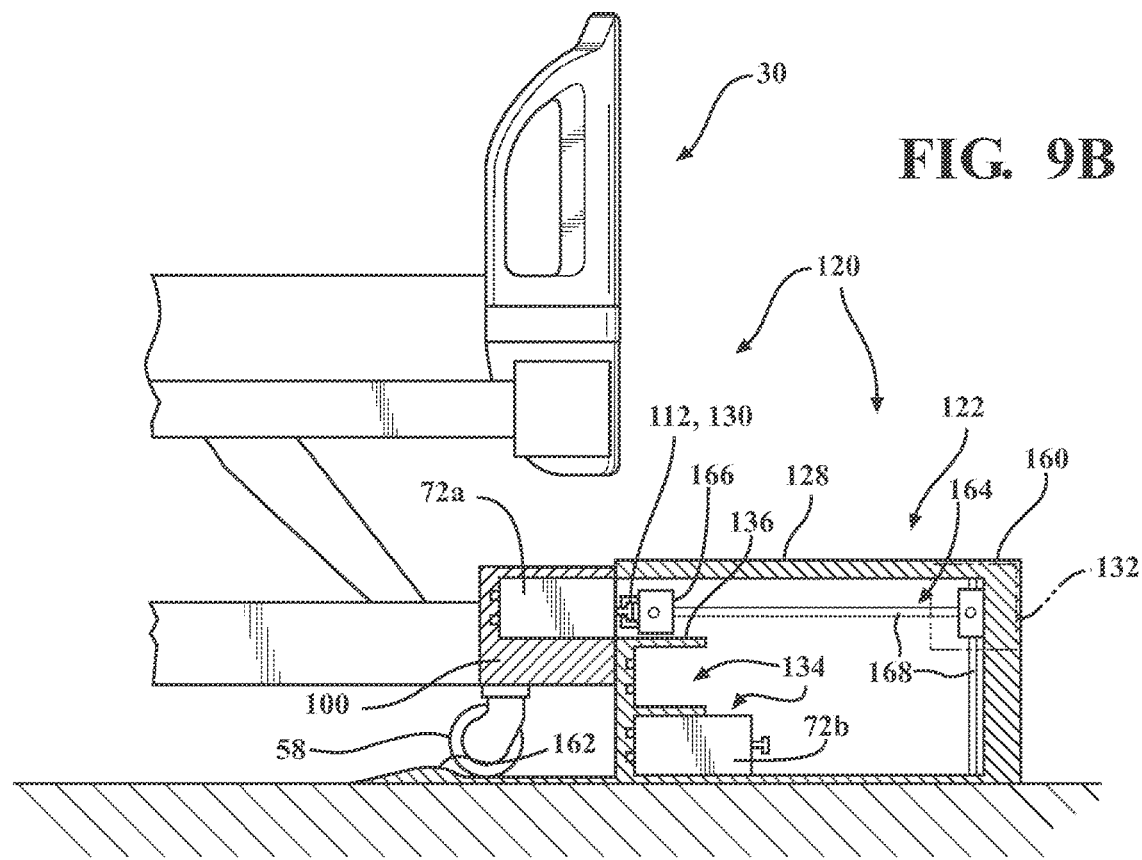

In FIG. 9B, the wheel 58 of the patient support apparatus 30 rolls over the wedge 162 causing the patient support apparatus 30 to be pushed towards the docking system 128 due to the decline of the wedge 162. The wedge 162 may be spaced from the docking system 128 according to a predetermined distance to enable such docking. Once docked, the receptacle 100 of the patient support apparatus 30 is disposed adjacent to an opening in the housing 160 of the docking system 128. Here, the rail unit 166 moves with the horizontal guide track 168 towards the opening in the housing 160. The second interface 130 on the rail unit 166 engages the first unit 122 of the ESD 72a within the receptacle 100.

Figure 9C:
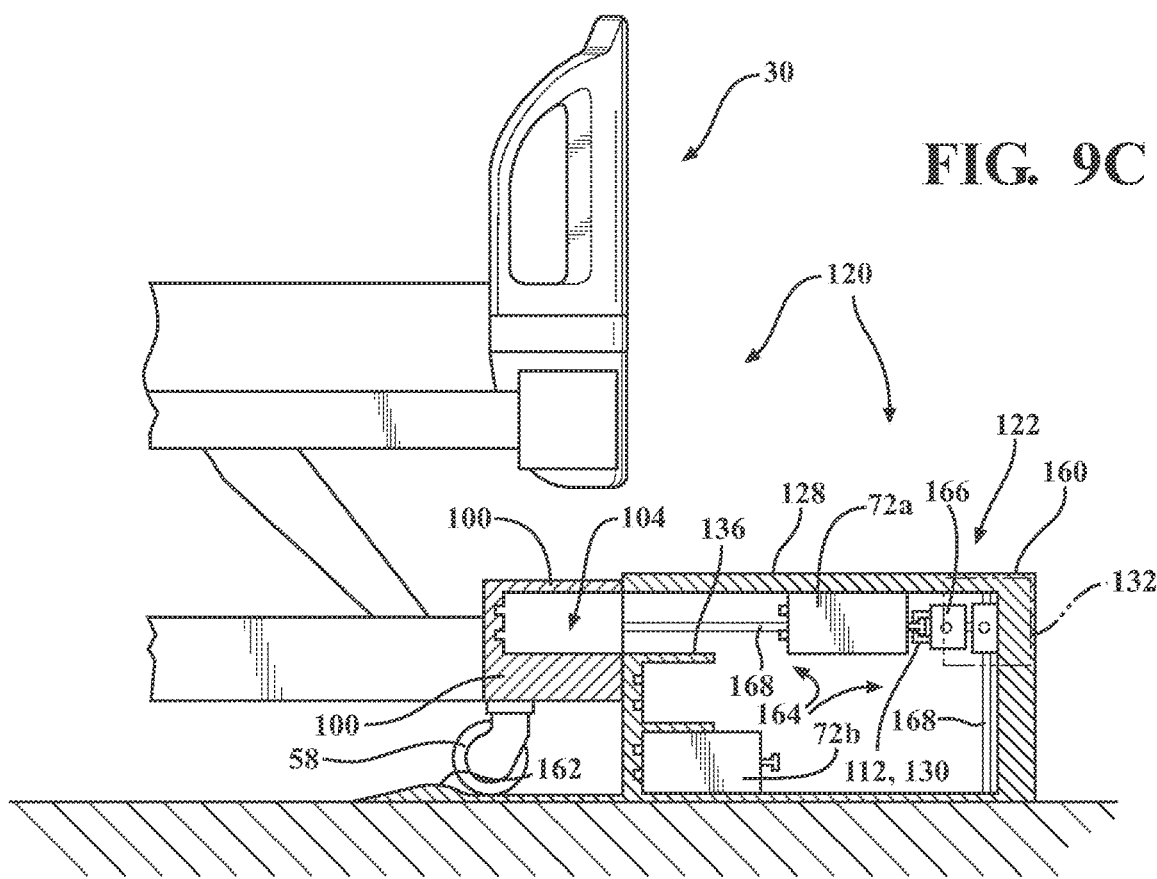

In FIG. 9C, the rail unit 166 is moved with the horizontal guide track 168 in the opposite direction thereby removing the ESD 72a from the receptacle 100. The rail unit 166 moves the ESD 72a using physical engagement from the interfaces 112, 130 to prepare positioning of the ESD 72a into the charging station 134. As shown in FIG. 9C, the charging station 134 comprises one vacancy for receiving the ESD 72a.

Figure 9D:
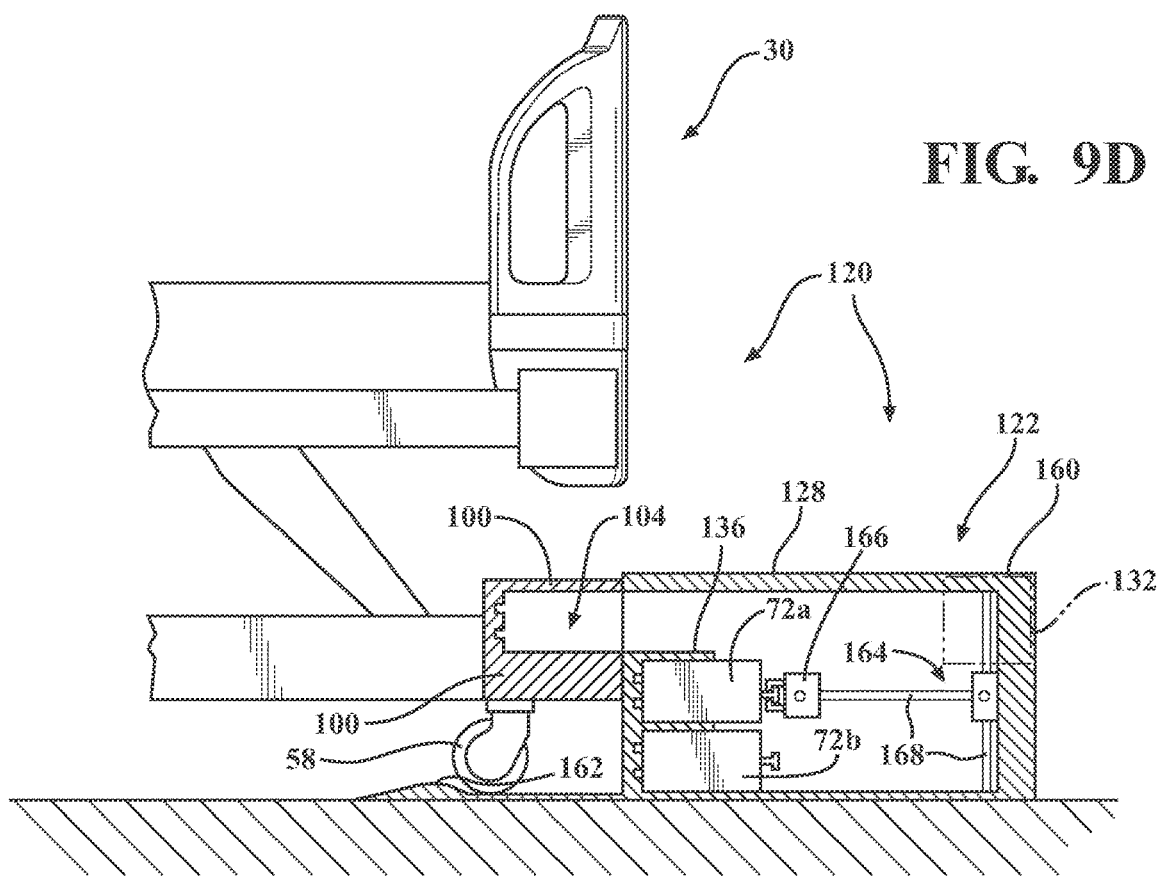

In FIG. 9D, the rail unit 166 is moved down the vertical guide track 168 to align the ESD 72a to the charging station 134. Once aligned, the rail unit 166 is moved horizontally with the horizontal guide track 168 to push the ESD 72a into the charging station 134.

Figure 9E:
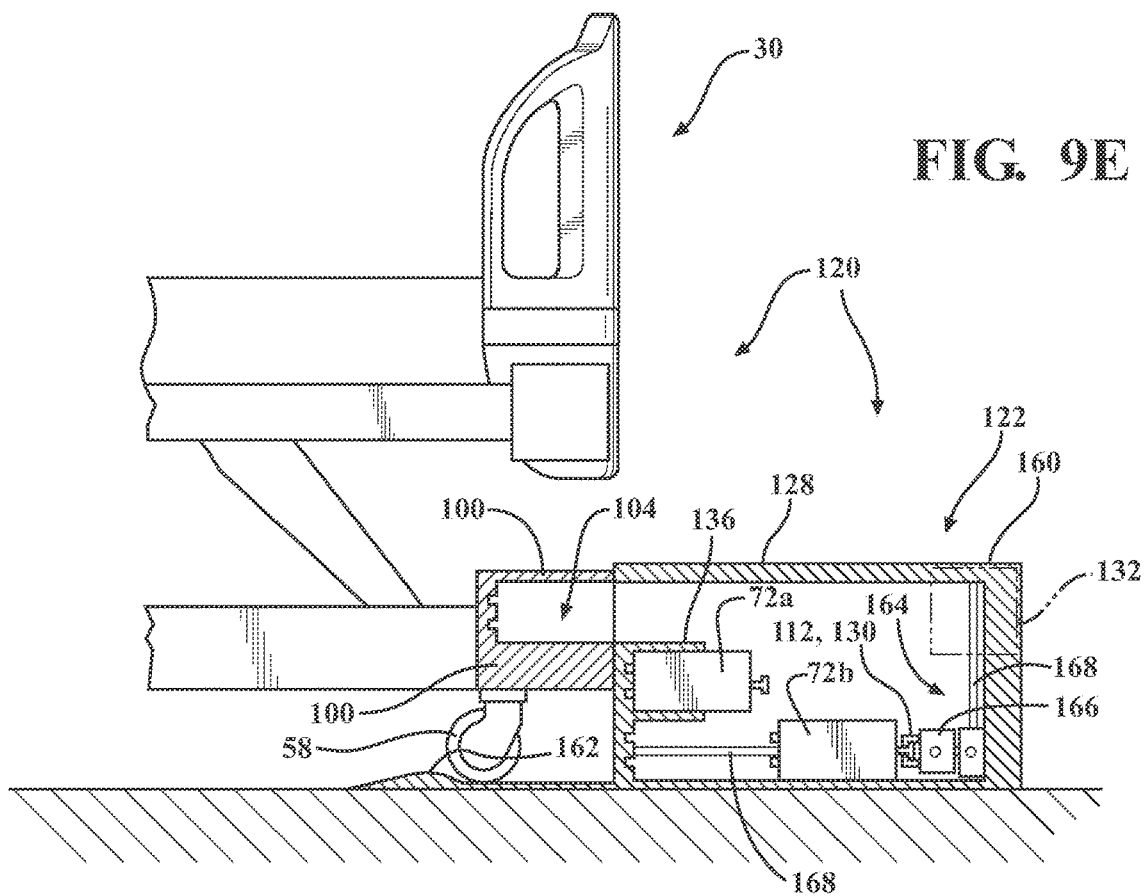

Knowing that the replacement ESD 72b is needed in this example, and knowing the location of the replacement ESD 72b in the housing 160, the docking system 128, in FIG. 9E, moves the rail unit 166 down with the vertical guide track 168 to physically engage the replacement ESD 72b. In so doing, the rail unit 166 removes the replacement ESD 72b from the charging station 134 using physical connection of the interfaces 112, 130.

Figure 9F:
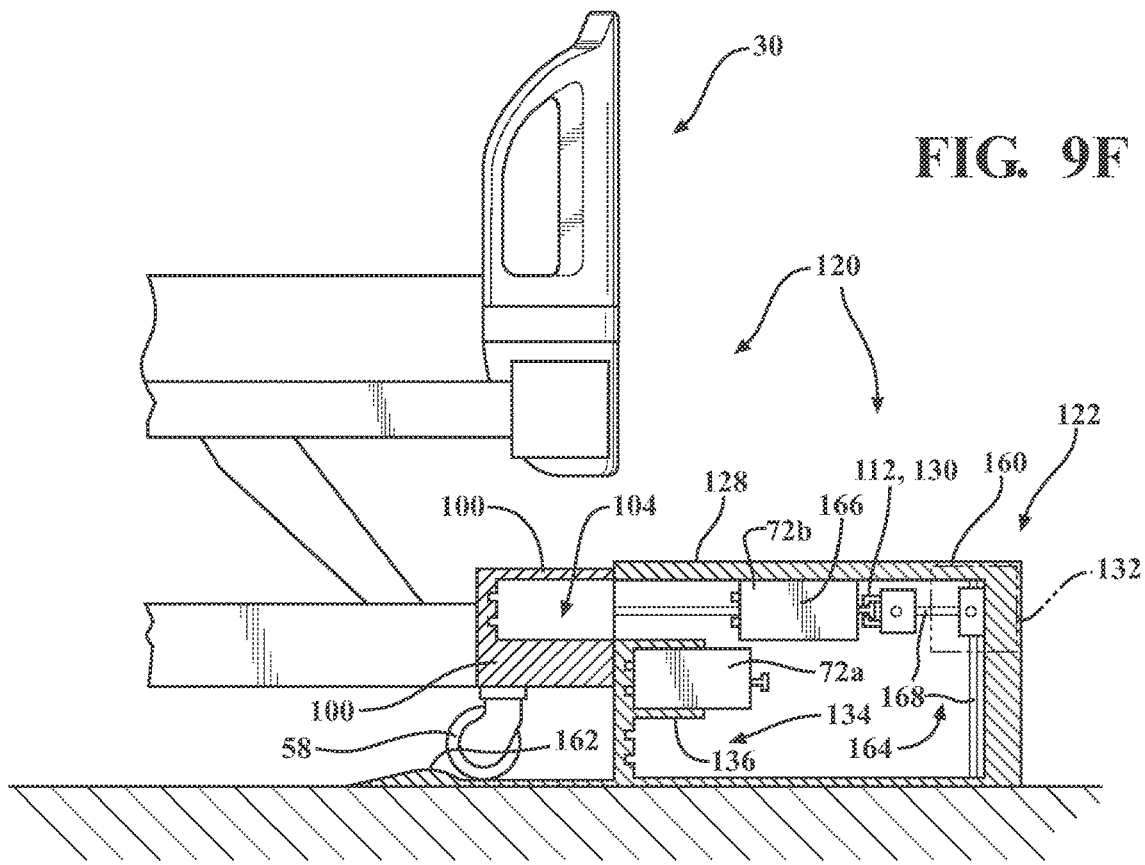

In FIG. 9F, the rail unit 166, along with the replacement ESD 72b, are moved up with the vertical guide track 168 to align the replacement ESD 72b with the opening in the housing 160, which remains aligned with the receptacle 100 of the patient support apparatus 30.

Figure 9G:
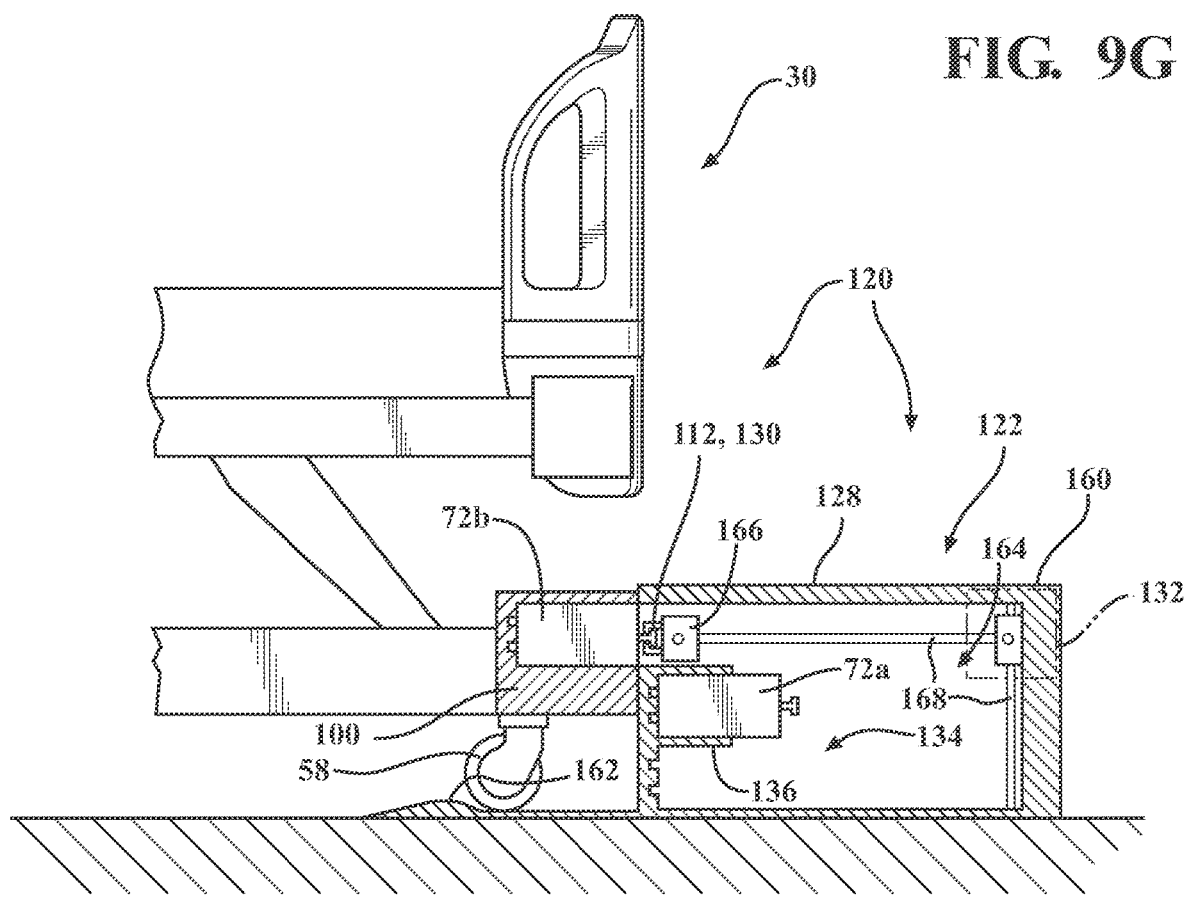

Finally, in FIG. 9G, the rail unit 166 moves with the horizontal guide track 168 to force the replacement ESD 72b through the opening of the housing 160 and fully into the receptacle 100. After installing the replacement ESD 72b, the docking system 128 disengages the interfaces 112, 130 so that the patient support apparatus 30 is free to be undocked.

The docking system 128 may have configurations other than those shown in FIG. 9. Furthermore, docking capabilities in the unit 122 may be provided with any of the embodiments described herein or shown in the Figures.

III. Communication System and Software Program

Figure 11:
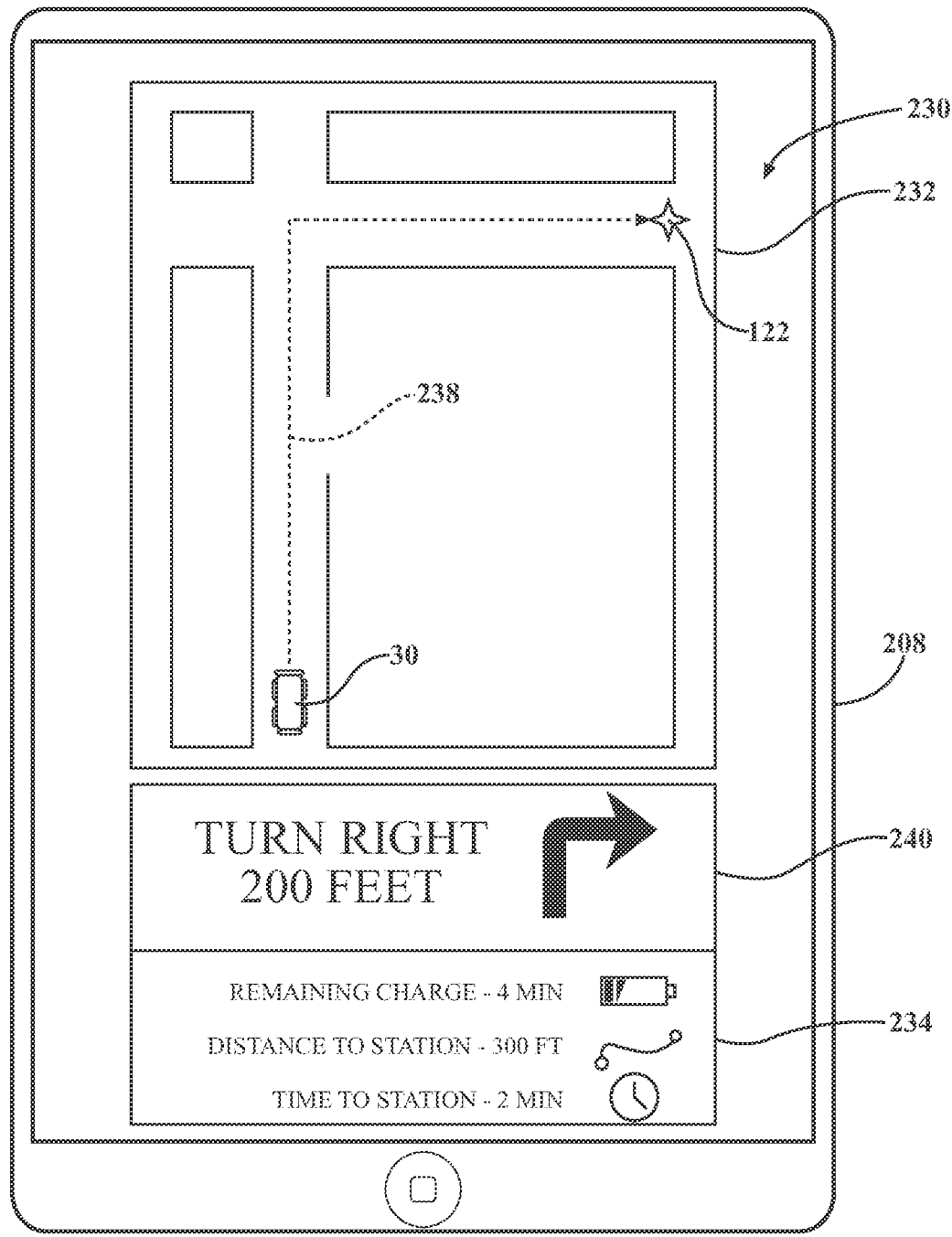
FIG. 11 is a sample screen shot of a graphical user interface provided on a display for conveying information between the patient support apparatus and the swapping unit.

Referring now to FIGS. 2, 10 and 11, components, systems, and techniques are provided which facilitate communication between the patient support apparatus 30 and the unit 122, the caregiver and the patient support apparatus 30, and the caregiver and the unit 122.

FIG. 10 illustrates a block diagram of one embodiment of a communication system 200. The communication system 200 comprises a plurality of the patient support apparatuses 30, which are configured to be located in the facility 22. The patient support apparatuses 30 are equipped with sensors 82, such as those described herein, which are configured to produce readings about behavior of the patient support apparatuses 30 in the facility, and the like. The patient support apparatus 30 transmits the readings using the communication device 80.

FIG. 10 further illustrates a sample block diagram of the unit 122. The unit 122 may be equipped with sensors 202, such as those any of those described herein with reference to the patient support apparatus 30, which are configured to produce readings about behavior of the unit 122 in the facility, and the like. The unit 122 may comprise a display device 204, having any suitable embodiment, such as those described with reference to the display device 78 of the patient support apparatus 30. The unit 122 transmits the readings using a communication device 206 that may be of any suitable configurations, such as the configurations of the communication device 80 of the patient support apparatus 30, as described herein.

A mobile computing device 208 that is independent of the patient support apparatus 30 may be provided. The mobile computing device 208 may convey information about the patient support apparatus 30 and/or the unit 122. The mobile computing device 208 may be carried by an individual in the facility who may interacts with the patient support apparatus 30 and/or the unit 122. Examples of such individuals include, but are not limited to, caregivers, other healthcare personnel, facility maintenance personnel, patients, and the like. The mobile computing device 208 may be any suitable device, such as a tablet or smart phone, etc. The mobile computing device 208 may have access to a map of the facility through an updatable software application. Additionally, application programming interfaces (APIs) may be utilized to retrieve map information. The mobile computing device 208 may be equipped with its own display device, sensors, and communication unit, which may be like those described herein.

A server 210 is configured to receive the readings of the sensors 82, 202 over one or more networks 212a, 212b. The server 210 is configured to analyze the readings, and to respond to any of the communication units 80, 206. For example, the server 210 may receive readings from sensors 82 of the patient support apparatus 30 and, in response, communicate information to the unit 122, to the mobile computing device 208, or any combination thereof. The server 210 may be configured to analyze the readings using a navigation module 214 and receive readings and/or transit information and/or using a communication module 216.

The navigation module 214 is provided for location services for the patient support apparatus 30, the unit 122, and/or the mobile computing device 208. The navigation module 214 may include sub-modules, such as an analysis sub-module configured to analyze the readings from the sensors 82, 202, a map module configured to determine a map of the facility and to determine the position and/or orientation of the patient support apparatus 30, the unit 122, and/or the mobile computing device 208 relative to the facility map.

Access points 218 are configured to be disposed throughout the facility and are configured to receive the readings from the patient support apparatus 30, the unit 122, and/or the mobile computing device 208, e.g., over the network 212a, and to send the readings to the server 210, e.g., over the network 212b. The communication system 200 may have configurations or functionality other than that described herein.

A non-transitory computer-readable medium 220a-220c, or memory, may be provided on the patient support apparatus 30, the unit 122, the mobile computing device 208, and/or the server 210. The memory 220 may store instructions, which implement a software program. Thus, the software program may exist on the memory 220 of any one or more of the patient support apparatus 30, the unit 122, the mobile computing device 208, and/or the server 210. The software program comprises instructions, which when executed by one or more processors, are configured to provide information presentable on one of the display devices 78, 204 relating to interaction between the patient support apparatus 30 and the unit 122. The software program may be configured to track a location of the patient support apparatus 30 and a location of the unit 122 in the facility, e.g., using the communication system 200.

The software program enhances the ESD 72 swapping techniques described above. The software program gives the user of the patient support apparatus 30 sophisticated insight into information relating to the ESD 72, and swapping thereof, that would otherwise be unavailable to or unobtainable by the user.

One example of a graphical user interface (GUI) 230 produced by the software program is shown in FIG. 11. In this example, the GUI 230 is provided on the display device of the mobile computing device 208. As mentioned, any of the other display devices 78, 204 may be used instead. As shown on the GUI 230, a map 232 of the facility is provided showing respective positions of the patient support apparatus 30 and the unit 122 relative to each other on the map 232. This helps to show the user where the nearest unit 122 is relative to the location of the patient support apparatus 30.

The software program is configured to display a notification 234 regarding a status of the ESD 72a used by the patient support apparatus 30. The notification 234, for example, may convey information indicative of needed removal of the ESD 72a and/or needed placement of the replacement ESD 72b using the unit 122. In FIG. 11, the notification 234 conveys a remaining charge of the ESD 72a used by the patient support apparatus 30, which in this example is 4 minutes. This enables the user to understand precisely how long the patient support apparatus 30 can use the ESD 72a before losing operation of electrical subsystems, or power, in general. Such information further provides the user with an understanding of how much time remains to find the nearest unit 122 before losing power.

The notification 234 may also display a proximity between the patient support apparatus 30 and the unit 122 according to time and/or distance. For example, as shown in FIG. 11, the GUI 230 displays the distance to the unit 122 being 300 feet and the time to the unit 122 being 2 minutes. The navigation module 214 in the server 210 may compute such information using sensor data about the speed of the patient support apparatus 30 and/or unit 122, if mobile, as well as any historical data relating to the same. Such information also enhances the user experience by conveying to the user how far the nearest unit 122 is to the patient support apparatus 30.

The software program may further enable the GUI 230 to display navigation information to help the patient support apparatus 30 reach the unit 122. For instance, the GUI 230 may display a projected and optimized route 238 on the map 232 that the patient support apparatus 30 should travel to reach the unit 122 in the projected time. The GUI 230 may also display directions 240 specifically computed to help the patient support apparatus 30 follow the route 238. In FIG. 11, the directions 240 convey that the patient support apparatus 30 should turn right after 200 feet in order to approach the nearest unit 122. The navigation module 214 in the server 210 may compute such information using location data about the patient support apparatus 30 and/or unit 122, as well as any historical data relating to the same.

The software program may also convey information relating to actions performed by the unit 122 relative to the patient support apparatus 30. For example, the GUI 230 may display a notification conveying any one or more of the following: removal of the ESD 72a by the unit 122, installation of the replacement ESD 72b by the unit 122, a docking or communication linking status between the patient support apparatus 30 and the unit 122, and the like. The software program may convey information relating to the unit 122 other than those described herein.

Furthermore, in additional embodiments, the server 210 may enable the software program to provide notifications to the display devices 78, 204 regarding service notifications for any of the ESDs 72, 86. The server 210 may be provided with predictive maintenance algorithms that can keep track of usage, and anticipated service life of any of the ESDs 72, 86. The notifications can be triggered in response to the ESD 72 being swapped a specific number of times, for instance, or based on the overall time the ESD 72 has been utilized during its lifetime. The ESDs 72 may be equipped with sensors or communication devices for sending data for service or tracking purposes. Such data may be sent using the communication device 80 of the patient support apparatus 30, for example. The status of the ESDs 72 can be communicated to the server 210 such that the server 210 can keep a running log of the usage and location of the ESDs 72. In some embodiments, the software program notifies the user about the quantity of available ESDs 72. For instance, the notification may convey how many replacement ESDs 72b are available at each unit 122. In another example, the notification conveys where in the facility ESDs 72 are in low or high supply. For example, when in short supply in a region of the facility, the notification can be sent to promote the user to utilize certain units 122 in that region of the facility and to let the unit 122 retrieve ESDs 72 from the patient support apparatus 30 to increase supply in the region. Service related features may be provided by the server 210 and/or software program other than those described herein.

IV. ESD Control Techniques

As described in relation to FIG. 2, the patient support apparatus 30 may comprise techniques for controlling the first ESD 72 and/or second ESD 86.

In one technique, control block 88a implements a constant charging circuit. The charging circuit regulates charging of the ESD 72. This circuit prevents the electrical distribution system 84, or any of the electrical devices 70, from drawing excessive current or voltage from the facility power supply when the patient support apparatus 30, is first turned on. This helps prevent the high-density ESD 72 from overheating. The charging circuit regulates charge provided to the ESDs 72 such that the provided current or voltage is relatively uniform. For constant current, the circuit may comprise an integrated circuit that varies voltage applied to the ESD 72 to maintain a constant current flow. For constant voltage, the circuit may comprise a step down transformer with a rectifier to provide the DC voltage to charge the ESDs 72. Other charging control schemes, such as trickle charging, pulsed charging, and other slow or fast charging schemes may be utilized.

In another technique, charge supplied to, and/or charge supplied from the ESD 72 and second ESD 86 is regulated by the controller 68 in tandem. As mentioned, the second ESD 86 is of a different type as compared with the first ESD 72. Although the term "second" is used to describe the second ESD 86, the second ESD 86 may be the primary energy supply for the patient support apparatus 30 while the ESD 72 is a back-up energy supply. On the other hand, the ESD 72 may be the primary energy supply while the second ESD 86 is a back-up supply of energy.

It may be desirable for the patient support apparatus to rely on both the ESD 72 and the second ESD 86 for power, in some examples. However, it may also be desirable to rely only on one of the ESD 72 and second ESD 86 for power, and not both at the same time.

To manage the aforementioned scenarios, the controller 68 may include an ESD module 300, as shown in FIG. 2. The ESD module 300 is configured to analyze the states of the ESD 72 and the second ESD 86. The ESD module 300 may use control blocks 88a, 88b for managing energy among the ESD 72 and the second ESD 86. In one embodiment, the energy ESD module 300 is configured to selectively determine whether to charge the ESD 72 or second ESD 86. Additionally, or alternatively, the ESD module 300 is configured to determine whether to release energy from the ESD 72 or second ESD 86.

The ESD module 300 may make such determinations depending a plurality of factors, such as a measured self-discharge of the ESD 72 or second ESD 86, the inherent charging/discharging properties of the high-density ESD 72 as compared with the second ESD 86, a storage capacity of the ESD 72 or second ESD 86, a current charge level of the ESD 72 or second ESD 86, and the like. Another factor used in determinations made by the ESD module 300 may include characteristics of the power demanded by the electrical devices 70, as determined by the controller 68. For example, the ESD module 300 may tap energy from the high-density ESD 72 to satisfy a sudden spike in demanded power, knowing that the charge level of the ESD 72 would otherwise be lost from inherent self-discharge. Any other factors may be utilized in making such energy management determinations.

To execute such control, the controller 68 can selectively disconnect one of the ESDs 72, 86 from the electrical distribution system 84, using, for example, the control block 88a. In response to selectively disconnecting one of the ESDs 72, 86, the controller 68 can selectively connect, or otherwise confirm connection of, the other one of the ESDs 72, 86 to the electrical distribution system 84 to power the one or more electrical devices 70 instead of the disconnected ESD 72, 86. Control schemes for managing the ESDs 72, 86 may have configurations other than those shown and described herein.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A system comprising:
 a patient support apparatus including:
  a support structure having a base and a patient support surface for a patient;
  an electrical distribution system;
  one or more electrical devices; and
  an energy storage device (ESD) configured to store energy to power the one or more electrical devices through the electrical distribution system;
 a unit being independent from the patient support apparatus and including a charging station for coupling to and charging the ESD and one or more replacement ESDs; and
 a mobile computing device independent of the patient support apparatus and the unit, the mobile computing device including a display device, one or more processors, and a non-transitory computer-readable medium comprising instructions, which when executed by the one or more processors, are configured to provide information presentable on the display device relating to directions to navigate the patient support apparatus to the unit.

2. The system of claim 1, wherein the instructions, when executed by the one or more processors, are further configured to determine a location of the patient support apparatus and to determine a location of the unit.

3. The system of claim 1, wherein the instructions, when executed by the one or more processors, are further configured to provide a notification on the display device regarding needed replacement of the ESD with a charged replacement ESD coupled to at the charging station of the unit.

4. The system of claim 1, wherein the instructions, when executed by the one or more processors, are further configured to provide a proximity between the patient support apparatus and the unit according to time and/or distance.

5. The system of claim 1, wherein the charging station is coupled to the unit.

6. The system of claim 1, wherein the unit further comprises a docking system configured to enable docking between the patient support apparatus and the unit.

7. The system of claim 1, wherein the unit is configured to autonomously interact with the patient support apparatus to remove the ESD from the patient support apparatus and/or to place a replacement ESD on to the patient support apparatus.

8. The system of claim 7, wherein the unit comprises a robotic device being configured to remove the ESD and/or to place the replacement ESD.

9. The system of claim 7, wherein the unit is mobile and configured to receive tracking information about the patient support apparatus to autonomously approach the patient support apparatus.

10. The system of claim 1, wherein the ESD includes a casing having a first interface;
 wherein the charging station of the unit comprises a second interface configured to engage the first interface to facilitate charging the ESD via the charging station; and
 wherein the first and second interfaces are mechanical interfaces being configured to mechanically interlock.

11. The system of claim 1, wherein the ESD includes electrical contacts; and
 wherein the patient support apparatus includes a receptacle for housing the ESD and having electrical contacts coupled to the electrical distribution system and being configured to interface with the electrical contacts of the ESD to power the one or more electrical devices through the electrical distribution system.

12. The system of claim 11, wherein the unit is further configured to autonomously remove the ESD from the receptacle and/or to autonomously place a replacement ESD into the receptacle.

13. The system of claim 12, wherein the unit comprises a receptacle for housing the ESD and/or the replacement ESD; and
 wherein the unit is further configured to autonomously place the ESD into the receptacle and/or to autonomously remove the replacement ESD from the receptacle.

14. The system of claim 13, wherein the receptacle of the unit includes electrical contacts coupled to a power source of the charging station and being configured to interface with the electrical contacts of the ESD and/or with electrical contacts of the replacement ESD to enable the power source to electrically charge the ESD and/or the replacement ESD.

15. The system of claim 1, wherein the patient support apparatus further comprises a second ESD being of a different type than the ESD and with the second ESD being connectable to the electrical distribution system to power the one or more electrical devices.

16. The system of claim 15, wherein the patient support apparatus further comprises a controller being configured to:
evaluate a state of the second ESD; and
selectively disconnect the second ESD from the electrical distribution system in response to evaluating the state of the second ESD.

17. The system of claim 16, wherein, in response to selectively disconnecting the second ESD, the controller is further configured to selectively connect the ESD to the electrical distribution system to power the one or more electrical devices instead of the second ESD.

18. The system of claim 15, wherein the ESD is a supercapacitor.

19. The system of claim 15, wherein the ESD is a Lithium ion battery.

20. A system comprising:
a patient support apparatus including:
a support structure having a base and a patient support surface for a patient;
an electrical distribution system;
one or more electrical devices; and
an energy storage device (ESD) configured to store energy to power the one or more electrical devices through the electrical distribution system;
a unit being independent from the patient support apparatus and including a charging station to charge the ESD; and
a mobile computing device independent of the patient support apparatus and the unit, the mobile computing device including a display device, one or more processors, and a non-transitory computer-readable medium comprising instructions, which when executed by the one or more processors, are configured to provide information presentable on the display device relating to proximity between the patient support apparatus and the unit according to time and/or distance.

* * * * *